US012641589B2

(12) United States Patent
Pope et al.

(10) Patent No.: US 12,641,589 B2
(45) Date of Patent: May 26, 2026

(54) METHODS AND DEVICES OF CLEAR MEDIUM CALIBRATION COORDINATION

(71) Applicant: Morse Micro Pty. Ltd., Surry Hills (AU)

(72) Inventors: Andrew Ross Pope, Surry Hills (AU); Thomas Peter James Dransfield, Surry Hills (AU)

(73) Assignee: Morse Micro Pty. Ltd., Surry Hills (AU)

( * ) Notice: Subject to any disclaimer, the term of this patent is extended or adjusted under 35 U.S.C. 154(b) by 315 days.

(21) Appl. No.: 18/532,895

(22) Filed: Dec. 7, 2023

(65) Prior Publication Data

US 2024/0284435 A1     Aug. 22, 2024

(30) Foreign Application Priority Data

Feb. 16, 2023    (AU) ................................ 2023900387

(51) Int. Cl.
| | |
|---|---|
| *H04W 72/12* | (2023.01) |
| *H04B 17/11* | (2015.01) |
| *H04B 17/21* | (2015.01) |
| *H04W 74/0816* | (2024.01) |

(52) U.S. Cl.
CPC ............ *H04W 72/12* (2013.01); *H04B 17/11* (2015.01); *H04B 17/21* (2015.01); *H04W 74/0816* (2013.01)

(58) Field of Classification Search
CPC ............ H04W 72/12; H04W 74/0816; H04W 72/0446; H04W 84/12; H04W 74/006; H04W 74/002; H04W 24/02; H04W 52/0216; H04W 88/08; H04W 52/02; H04W 28/065; H04B 17/11; H04B 17/21; H04B 7/24; H04L 12/00

See application file for complete search history.

(56) References Cited

U.S. PATENT DOCUMENTS

| | | | |
|---|---|---|---|
| 9,913,292 B2 | 3/2018 | Kim et al. | |
| 2016/0057780 A1* | 2/2016 | Kim ................... | H04W 74/006 |
| | | | 370/338 |
| 2016/0119902 A1 | 4/2016 | Cheong et al. | |
| 2016/0261303 A1* | 9/2016 | Hsu .......................... | H04B 1/44 |
| 2017/0127419 A1 | 5/2017 | Seok | |
| 2017/0142717 A1* | 5/2017 | Park .................. | H04W 72/0446 |

FOREIGN PATENT DOCUMENTS

| | | |
|---|---|---|
| EP | 2893762 B1 | 3/2018 |
| WO | 2020097487 A1 | 5/2020 |

* cited by examiner

*Primary Examiner* — Kyaw Z Soe
(74) *Attorney, Agent, or Firm* — Polsinelli PC

(57) ABSTRACT

Systems and techniques are provided for performing wireless communications. In some aspects, calibration of a station (STA) in a wireless communication network can be managed based on receiving a beacon frame that includes a Restricted Access Window (RAW) Parameter Set (RPS) Information Element (IE), and determining that an Association Identity (AID) indicated in the RPS IE of the received beacon frame matches a calibration AID associated with the STA. A process can further include determining a RAW based on the RPS IE and scheduling a RAW clear medium calibration (RAW-cmc) event within the RAW, based at least in part on the determination that the AID indicated in the RPS IE matches the calibration AID. Subsequently, the scheduled RAW-cmc event within the RAW can be used to perform calibration for the STA as scheduled.

22 Claims, 16 Drawing Sheets

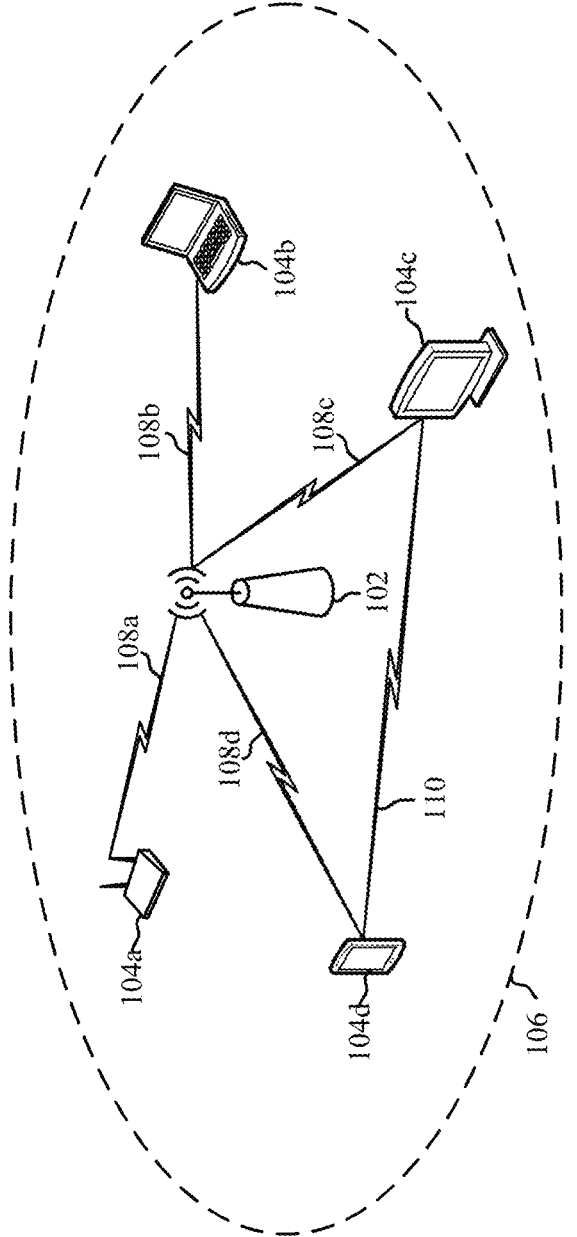
FIG. 1A

300

302 304 306

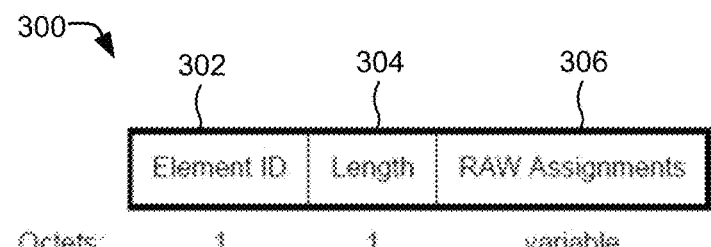

| Element ID | Length | RAW Assignments |
|---|---|---|

Octets: 1 1 variable

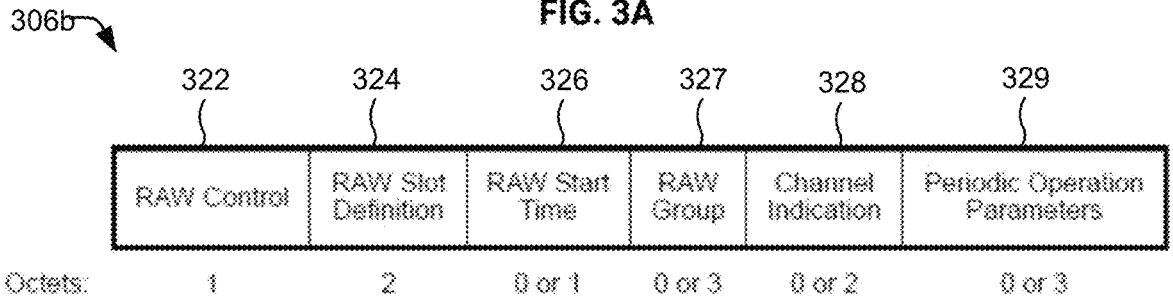

| RAW Control | RAW Slot Definition | RAW Start Time | RAW Group | Channel Indication | Periodic Operation Parameters |
|---|---|---|---|---|---|

Octets: 1 2 0 or 1 0 or 3 0 or 2 0 or 3

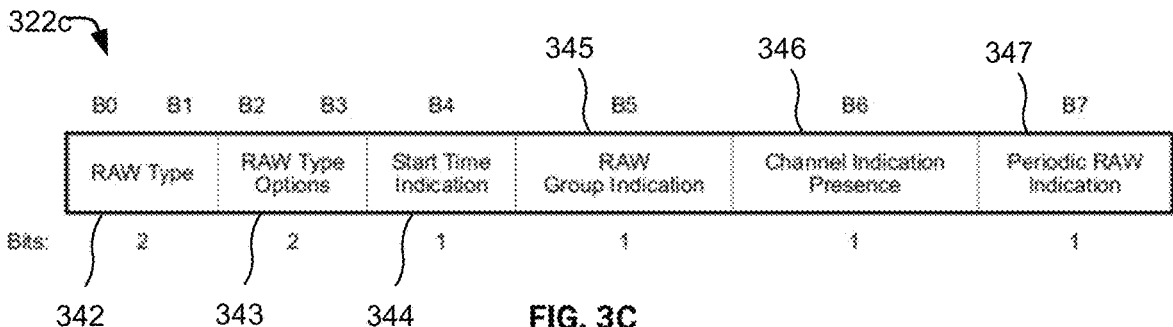

| RAW Type | RAW Type Options | Start Time Indication | RAW Group Indication | Channel Indication Presence | Periodic RAW Indication |
|---|---|---|---|---|---|

Bits: 2 2 1 1 1 1

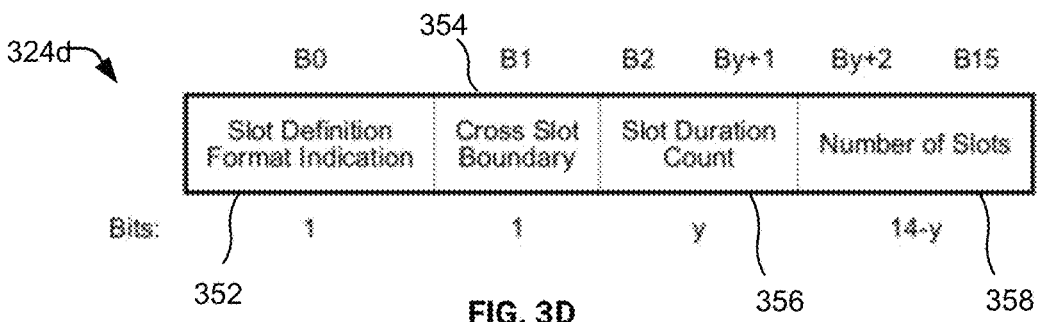

| Slot Definition Format Indication | Cross Slot Boundary | Slot Duration Count | Number of Slots |
|---|---|---|---|

Bits: 1 1 y 14-y 352 356 358

560 AP receives a CTS-to-self

562 CTS-to-self is orphaned

563 CTS-to-self partial AID matches a device in the BSS?

564 Average time between orphaned CTS-to-self less than current RAW-cmc calibration period?

565 RAW-cmc calibration period above lower threshold limit?

566 No update to RAW-cmc calibration period

568 Decrease RAW-cmc calibration period

700

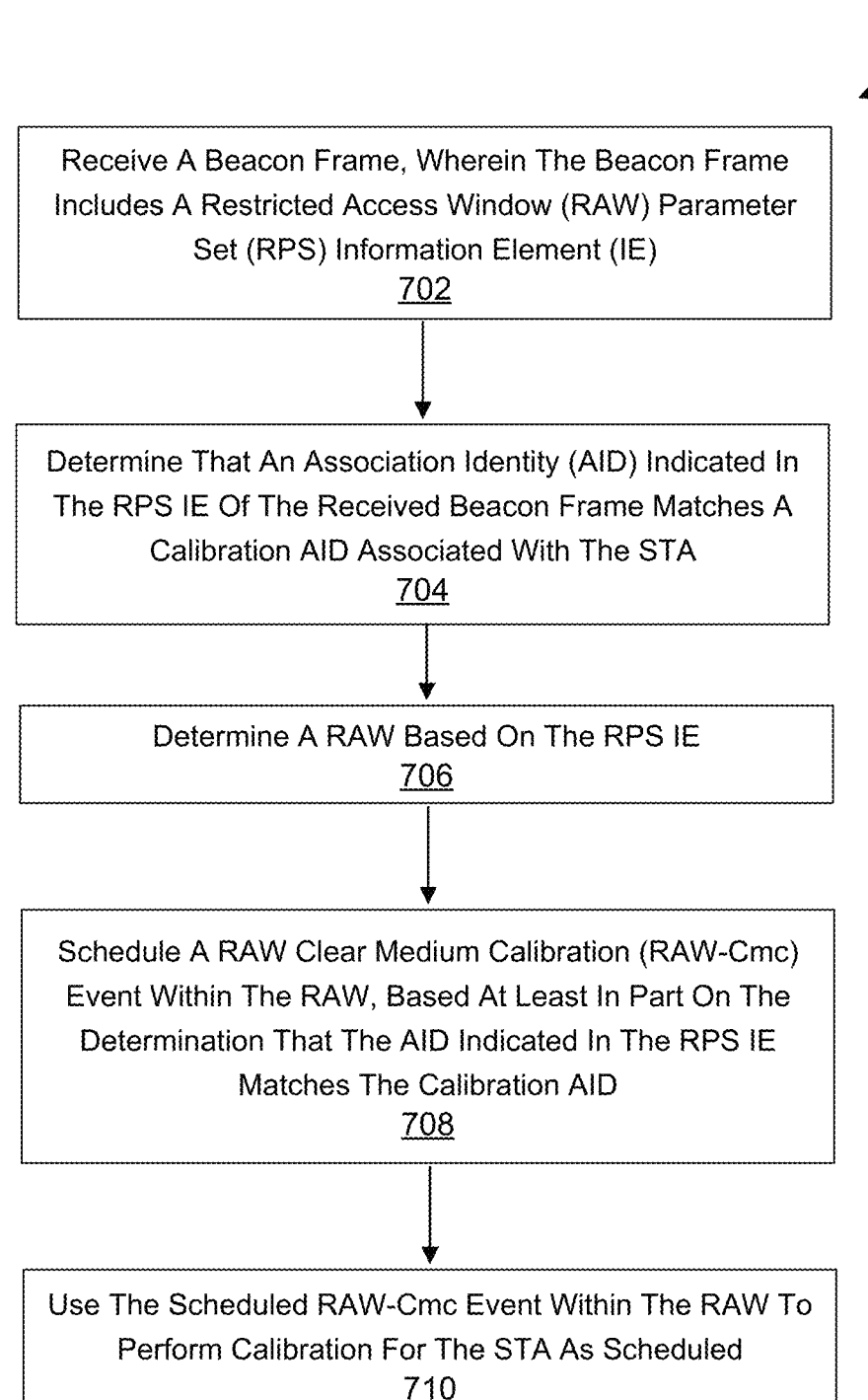

Receive A Beacon Frame, Wherein The Beacon Frame Includes A Restricted Access Window (RAW) Parameter Set (RPS) Information Element (IE)
702

Determine That An Association Identity (AID) Indicated In The RPS IE Of The Received Beacon Frame Matches A Calibration AID Associated With The STA
704

Determine A RAW Based On The RPS IE
706

Schedule A RAW Clear Medium Calibration (RAW-Cmc) Event Within The RAW, Based At Least In Part On The Determination That The AID Indicated In The RPS IE Matches The Calibration AID
708

Use The Scheduled RAW-Cmc Event Within The RAW To Perform Calibration For The STA As Scheduled
710

FIG. 7

METHODS AND DEVICES OF CLEAR MEDIUM CALIBRATION COORDINATION

CROSS-REFERENCE TO RELATED APPLICATIONS

This application claims the benefit of Australian Provisional Patent Application No. 2023/900387, filed Feb. 16, 2023 and entitled "METHODS AND DEVICES OF CLEAR MEDIUM CALIBRATION COORDINATION," which is hereby incorporated by reference, in its entirety and for all purposes.

FIELD

The present disclosure generally relates to wireless communications. For example, aspects of the present disclosure are related to clear medium calibration in a wireless communication network such as a Wireless Local Area Network (WLAN).

BACKGROUND

An Access Point (AP) manages one or more wireless devices, also known as stations (STAs), by acting as a medium and creating a wireless communication network for the STAs to communicate with each other through the AP. The AP enables the STAs to communicate bi-directionally with the AP and/or enables a STA to communicate with other STAs coupled to the AP. The AP may also allow all of its associated STAs to become connected to a wired or wireless communication network (e.g., such as the Internet, etc.). Prior to connecting to a particular wireless communication network, a STA sends an association request to a corresponding AP included in the particular wireless communication network. The association request transmitted by the STA and received by the AP can be used by the AP to check the validity of the STA, for example by checking if the STA has a matching Service Set Identifier (SSID). The AP may subsequently permit the association request (e.g., based on validating the STA and/or association request) or denies the association request (e.g., based on failing to validate the STA and/or association request).

If the STA receives an association response from the AP indicating the association is successful, the STA is allowed to communicate or transfer data frames to the AP, and the AP may forward the received data frames to one or more destination STAs. After successful association, STAs may need to periodically self-calibrate to the noise floor associated with communications to and/or from the STA (for instance, to maintain communication performance and/or for other operational reasons, etc.). The self-calibration process performed by a STA may require a quiet medium, such as a quiet wireless medium (WM) of the wireless communication network associated with the AP and STA. A quiet medium during self-calibration can ensure that spurious transmissions do not influence the results of the STA's self-calibration.

In some examples, the time period required for a quiet medium for Institute of Electrical and Electronics Engineers (IEEE) 802.11ah HaLow-based STAs can range up to 230 milliseconds (ms). A conventional HaLow-based STA may use the Clear To Send To Self (CTS-To-Self) mechanism to enforce a quiet medium during the self-calibration of the STA. For instance, the HaLow-based STA can be configured to send a CTS-To-Self frame indicative of the time duration required for exclusive access to the wireless medium by the STA. Other devices on the wireless network that receive and recognize this CTS-To-Self frame are configured to stay off the wireless medium for a given period of time.

The time to send a CTS-To-Self frame varies with the primary channel bandwidth, and for example, can be equal to the time to transmit a Null Data Packet (NDP) CTS plus the corresponding Short Interframe Space (SIFS). In cases of transmitting in a 1 MHz channel of a Wi-Fi HaLow-based network, the time to transmit a CTS-To-Self frame is 720 microseconds (us), whereas the time to transmit a CTS-To-Self frame in a 2 MHz channel is 400 μs. SIFS is the spacing prior to transmission of the CTS-To-Self frame, and can indicate the amount of time required for a wireless interface to process a received frame and respond with a response frame. For example, the SIFS is equal to 160 μs. In total, the time taken on the wireless medium for a self-calibration event for a single STA can be up to 230.88 ms (230 ms+720 μs+160 μs). During this time, the wireless medium is inaccessible for any kind of data transmission.

BRIEF SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication over a wireless communication network such as a Wireless Local Area Network (WLAN). According to at least one illustrative example, a method of wireless communication over a wireless communication network is provided, which comprises a method for managing calibration of a station (STA). The method for managing calibration comprising: receiving a beacon frame, wherein the beacon frame includes a Restricted Access Window (RAW) Parameter Set (RPS) Information Element (IE); determining that an Association Identity (AID) indicated in the RPS IE of the received beacon frame matches a calibration AID associated with the STA; determining a RAW based on the RPS IE; scheduling a RAW clear medium calibration (RAW-cmc) event within the RAW, based at least in part on the determination that the AID indicated in the RPS IE matches the calibration AID; and using the scheduled RAW-cmc event within the RAW to perform calibration for the STA as scheduled.

In some aspects, the RPS IE is indicative of information corresponding to one or more of a start time associated with the RAW, a slot duration associated with the RAW, or a number of slots associated with the RAW.

In some aspects, to perform calibration for the STA as scheduled, the STA calibrates one or more physical (PHY) layer parameters in the RAW-cmc event during the RAW.

In some aspects, the RAW-cmc event is scheduled based on a further determination that the STA supports RAW-cmc; and the method further includes restricting any transmission for the STA during the RAW based on a determination that the STA does not support RAW-cmc.

In some aspects, the method further includes: determining, in response to the determination that the AID indicated in the RPS IE matches the calibration AID, whether the STA requires calibration; scheduling the RAW-cmc event based on a determination that the STA requires calibration; and skipping scheduling of the RAW-cmc event based on a determination that the STA does not require calibration.

In some aspects, the determination that the STA requires calibration is based on an elapsed time since last quiet medium calibration for the STA.

In some aspects, the determination that the STA requires calibration is based on one or more external events observed by the STA in a PHY layer associated with the STA.

In some aspects, the calibration AID is configured by an Access Point (AP) associated with the STA, and wherein the calibration AID includes a static value configured within a higher range of allowed AIDs.

In some aspects, the method further includes: transmitting, by the STA, an association request to associate with an AP in the wireless communication network; receiving an association response from the AP, wherein the association response includes a RAW-cmc vendor IE indicative of the calibration AID and a calibration periodicity for the RAW-cmc event; and storing, by the STA, the calibration AID and calibration periodicity indicated in the RAW-cmc vendor IE.

In some aspects, the STA utilizes a quiet medium for calibration, and wherein the method further includes: determining that the STA supports RAW-cmc; determining, based on the determination that the STA supports RAW-cmc, whether the STA can delay performing the calibration until a next RAW-cmc event; and in response to determining that the STA does not support RAW-cmc or that the STA cannot delay performing the calibration until the next RAW-cmc event: transmitting, by the STA, a Clear To Send to self (CTS-To-Self) frame to reserve a quiet medium for calibration; and performing calibration for the STA using a reserved quiet medium corresponding to the CTS-To-Self frame.

In some aspects, the STA restricts any transmission during the RAW based on a determination that the AID indicated in the RPS IE does not match a calibration AID stored by the STA and does not match an AID associated with the STA.

In some aspects, the techniques described herein relate to a STA connected to a wireless communication network, the STA including: a receiver and a transmitter; a processor, communicatively coupled to the receiver and the transmitter; and one or more memory banks, communicatively coupled to the processor and storing processor readable codes that, when executed by the processor in conjunction with the receiver and transmitter, causes the processor to perform actions including: receiving a beacon frame with a RPS IE; determining whether an AID communicated in the RPS IE of the received beacon frame matches a calibration AID stored in the STA; determining a RAW according to the RPS IE; scheduling a RAW clear medium calibration (RAW-cmc) event during the RAW when the AID communicated in the RPS IE matches the calibration AID; and calibrating in the RAW-cmc event as scheduled or otherwise restricting any transmission during the RAW.

In some aspects, the techniques described herein relate to a method for managing calibration of STAs in a wireless communication network, the method including: determining, by an AP associated with the STAs, an elapsed time since a last RAW-cmc event on a wireless medium; based on the elapsed time being greater than a configured threshold time value, inserting an RPS IE including a RAW slot within a RAW associated with a calibration AID included in a beacon frame generated by the AP; and transmitting the beacon frame on the wireless medium from the AP to one or more STAs in the wireless communication network, wherein the wireless medium is reserved as a quiet medium during the RAW slot within the RAW for the one or more STAs to perform calibration.

In some aspects, a method further includes: receiving an association request from a STA in the wireless communication network; inserting a RAW-cmc vendor IE containing the calibration AID and calibration periodicity in an association response generated by the AP corresponding to the received association request from the STA; and transmitting the association response with the RAW-cmc vendor IE to the STA.

In some aspects, the RPS IE is indicative of information corresponding to one or more of a start time associated with a RAW, a slot duration associated with the RAW, or a number of slots associated with the RAW.

In some aspects, a method further includes: receiving a CTS-To-Self frame from a STA indicative of a request for calibration in a quiet medium; and reserving the wireless medium for the STA to perform calibration according to the CTS-To-Self frame, wherein a reserved wireless medium is inaccessible for any data transfer during a reserved time.

In some aspects, a method further includes: comparing the elapsed time since the last RAW-cmc event to a dynamic maintenance interval value obtained by the AP; and transmitting the beacon frame based on a determination that the elapsed time since the last RAW-cmc event is greater than the dynamic maintenance interval value.

The dynamic maintenance interval may be adaptively updated according to some embodiments. In some aspects, adaptively updating the dynamic maintenance interval includes decreasing the dynamic maintenance interval in response to: receiving an orphaned CTS-To-Self frame by the AP; determining, by the AP, that a CTS-To-Self partial AID matches with a device in the wireless communication network; determining, by the AP, that an average time between orphaned CTS-To-Self frames is less than the dynamic maintenance interval and that the dynamic maintenance interval is greater than a configured lower limit value. The orphaned CTS-To-Self frame may be defined as having a CTS time less than a valid frame time associated with the AP.

In some aspects, adaptively updating the dynamic maintenance interval further includes: determining that an update timer associated with the AP has expired; determining, by the AP and based on expiration of the update timer, whether the dynamic maintenance interval has been decreased in any one of a last 10 update intervals; and based on determining that the dynamic maintenance interval has not been decreased in any one of the last 10 update intervals, increasing the dynamic maintenance interval; or based on determining that the dynamic maintenance interval has been decreased in any one of the last 10 update intervals, using an unchanged dynamic maintenance interval value.

In some aspects, the techniques described herein relate to an AP connected to a wireless communication network, the AP including: a receiver and transmitter; a processor, communicatively coupled to the receiver and transmitter; and one or more memory banks, communicatively coupled to the processor and storing processor readable codes that, when executed by the processor in conjunction with the receiver and transmitter, is configured for: checking if there is enough time elapsed since a last RAW-cmc event; inserting a RPS IE with a RAW slot assigned to a calibration AID in a beacon frame when there is enough time elapsed since the last RAW-cmc event; transmitting the beacon frame to one or more STAs in the wireless communication network by the transmitter; and scheduling a current RAW-cmc event for device calibration.

In some aspects, the techniques described herein relate to a wireless communication device, wherein the wireless communication device is an AP or a STA.

Other objects and advantages associated with the aspects disclosed herein will be apparent to those skilled in the art based on the accompanying drawings and detailed description.

BRIEF DESCRIPTION OF THE DRAWINGS

Illustrative aspects of the present application are described in detail below with reference to the following drawing figures:

FIG. 1A is a block diagram illustrating an exemplary wireless communication network;

FIG. 3A is a diagram illustrating an example of the Restricted Access Window (RAW) Parameter Set (RPS) Information Element (RPS IE) defined by the IEEE 802.11ah HaLow specification;

FIG. 3B is a diagram illustrating an example of the RAW assignment subfield format associated with the RPS IE of FIG. 3A;

FIG. 3C is a diagram illustrating an example of the RAW control subfield format associated with the RPS IE of FIG. 3A;

FIG. 3D is a diagram illustrating an example of the RAW slot definition subfield format associated with the RPS IE of FIG. 3A;

FIG. 7 is a flow diagram of a wireless transmission method implemented in a STA, in accordance with some embodiments.

DETAILED DESCRIPTION

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Overview

As noted previously, in at least some examples, the time taken on a wireless medium for a self-calibration event by a Wi-Fi HaLow STA can be up to 230.88 ms, which is composed of 230 ms of quiet medium time period, 720 µs of transmission time for a CTS-To-Self frame in a 1MHz channel, and 160 µs of SIFS. During this time, the wireless medium is inaccessible for any kind of data transmission. As the usage and deployment of Internet of Things (IoT) devices and low-power wide area network (LPWAN) devices grows, the number of STAs that may be present in a given area has also grown. At these increasingly larger deployment scales, the wireless medium can quickly become saturated or overwhelmed by a plurality of STAs that each attempt to schedule their own quiet medium to perform self-calibration. For instance, in the example above where self-calibration by a single STA on a Wi-Fi HaLow network takes 230.88 ms on the medium, fewer than five STAs would be able to perform self-calibration per second, sequential self-calibration of multiple STAs would occupy the wireless medium for a long time.

Figure 1B:
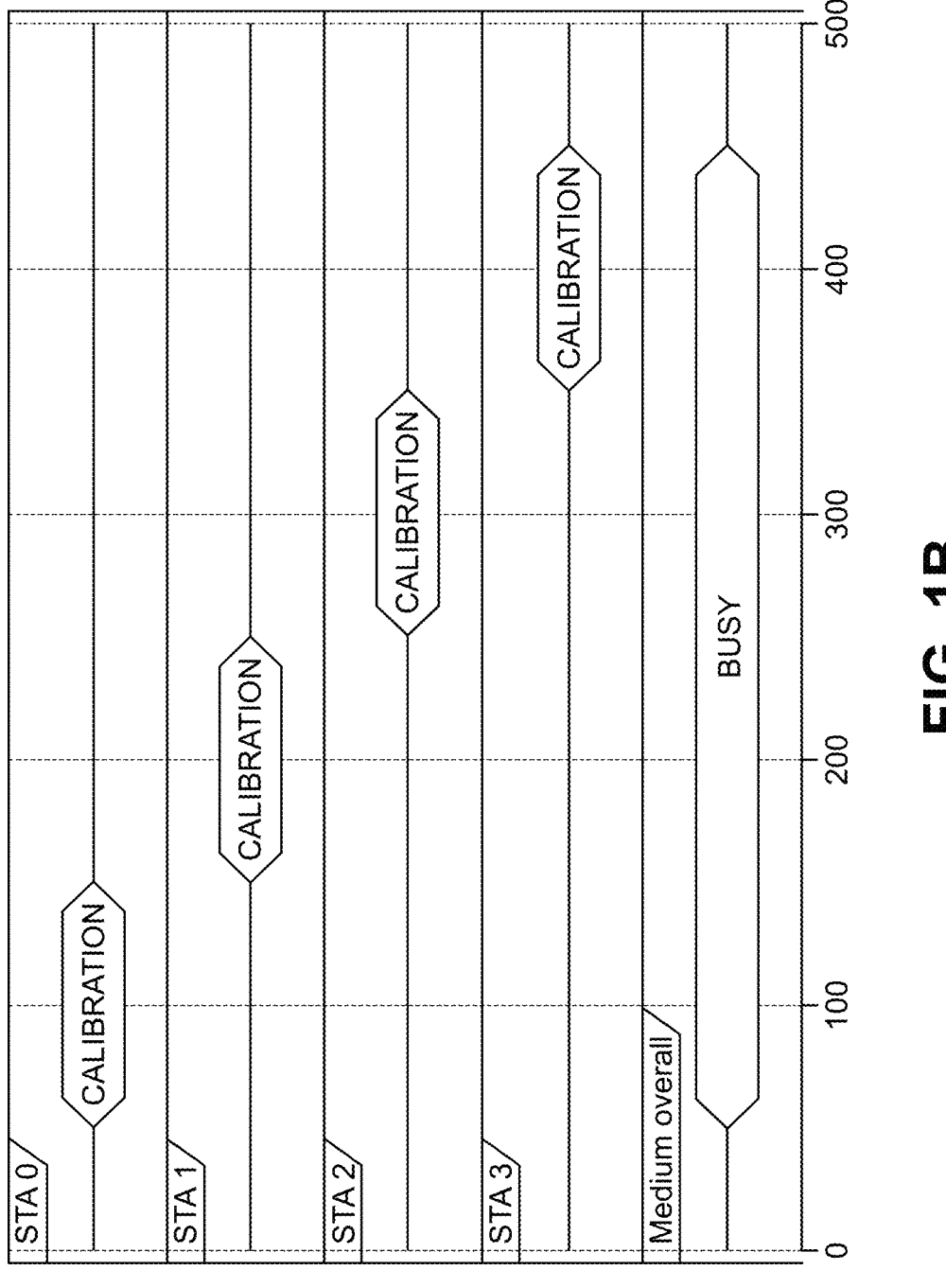
FIG. 1B is a diagram illustrating an example of wireless medium reservation by a plurality of stations (STAs)

This principle is illustrated in the example of FIG. 1B, which is a diagram illustrating an example of wireless medium reservation 150 by a plurality of stations (e.g., STA 0, STA 1, STA 2, STA 3). In the wireless medium reservation 150 timeline depicted in FIG. 1B, the four stations STA0-STA3 take turns to reserve the wireless medium for self-calibration, resulting in a long busy period restricting any data transmission on the wireless medium. A Wi-Fi HaLow based network currently may support a theoretical maximum of up to 8,000 STAs simultaneously. Accordingly, the presence of large numbers of STAs on a Wi-Fi HaLow network can result in significant performance degradation and network blocking, as each of the associated STAs periodically reserves the wireless medium to perform self-calibration, thereby preventing any STA from communicating over the wireless medium for a long period of time.

There is a need for systems and techniques that can be used to provide network coordination for and between a plurality of STAs that periodically perform self-calibration in a wireless network, including systems and techniques that can be used to provide support for self-calibration for a large number of STAs within a wireless communication network. Assuming a fully-loaded Wi-Fi HaLow network of 8,000 stations, a total of 1,847 seconds of quiet time (230.88 ms*8,000) would be needed for quiet medium calibration when using the conventional CTS-To-Self mechanism. However, self-calibration is a periodic process, normally required to be performed, for example, every 60 seconds, to ensure the station is in good synchronization with the AP. It is impractical to implement the CTS-To-Self mechanism for self-calibration in a wireless network with a large number of wireless devices, particularly when the total time of quiet medium required for self-calibration of all STAs far exceeds the periodicity of performing self-calibration for each STA.

Disclosed are systems, methods, apparatuses, and computer-readable media (collectively, "systems and techniques") that provide a novel and effective way to perform clear medium calibration, particularly for and/or within a wireless communication network supporting a large number of stations (STAs). Embodiments of a STA receive a beacon frame that includes and/or is indicative of a Restricted Access Window (RAW) Parameter Set (RPS) Information Element (IE). Based on receiving the beacon frame with a RAW IE (e.g., received from an AP), STAs can determine whether an Association Identifier (AID) communicated in the RPS IE of the received beacon frame matches a calibration AID stored in the STA. The calibration AID can be configured or pre-configured in a memory of the STA, including at the time of manufacture or deployment of the STA, and/or by the AP(s) associated with the STA, etc. Based on the AID communicated in the RPS IE matching the calibration AID associated with the STA, the STA can then determine a RAW according to the RPS IE, and can schedule a RAW clear medium calibration (RAW-cmc) event during the RAW. The STA consequently calibrates in the RAW-cmc event as scheduled. If the AID in the RPS IE does not match the calibration AID nor the AID of the STA, the STA stays out of the RAW and does not transmit or perform calibration during the RAW.

In some embodiments, the systems and techniques described herein can use the RPS IE in the beacon frame to carry information corresponding to (e.g., indicative of) a start time of the RAW, a slot duration in the RAW, and/or a number of slots in the RAW. In some embodiments, the STA calibrates the physical (PHY) layer-related settings, parameters, and/or coefficients in the RAW-cmc event during the RAW. An embodiment of the STA can further determine whether the STA supports RAW-cmc, and may restrict any transmission during the RAW if the STA does not support RAW-cmc. In cases when the AID communicated in the RPS IE matches the calibration AID, the STA may adaptively determine whether it needs to calibrate, and the STA only schedules the RAW-cmc event when it needs to calibrate. For example, the STA determines whether it needs to calibrate based on a time period since its last quiet medium calibration. In another example, the STA determines whether it needs to calibrate based on one or more external events observed in the PHY layer.

During association, the STA transmits an association request to an Access Point (AP) in the wireless communication network, receives an association response from the AP. In some embodiments, the AP inserts a RAW-cmc vendor IE in the association response, which includes the calibration AID and calibration periodicity. The STA extracts and stores the calibration AID and calibration periodicity communicated in the RAW-cmc vendor IE to determine whether the STA can perform self-calibration in subsequent RAWs. In some embodiments, when the STA requires a quiet medium for calibration outside the RAW, and the STA determines that it supports RAW-cmc, the STA may subsequently determine whether the STA can wait to perform calibration until a next RAW-cmc event. In some embodiments, when the STA does not support RAW-cmc or when the STA cannot wait until the next RAW-cmc event, the STA can be configured to transmit a CTS-To-Self frame to reserve a quiet medium for calibration, and to subsequently perform calibration in the quiet medium reserved by the CTS-To-Self frame.

In one illustrative example, systems and techniques are provided for a STA connecting to a wireless communication network. The STA comprises a receiver, a transmitter, a processor, communicatively coupled to the receiver and transmitter, and one or more memory banks. The memory banks communicatively coupled to the processor store processor readable codes that, when executed by the processor in conjunction with the receiver and transmitter, is configured for receiving a beacon frame with a RPS IE by the receiver, determining whether an AID communicated in the RPS IE of the received beacon frame matches a calibration AID stored in the STA, determining a RAW according to the RPS IE, scheduling a RAW-cmc event during the RAW when the AID communicated in the RPS IE matches the calibration AID, and calibrating in the RAW-cmc event as scheduled or otherwise restricting any transmission during the RAW.

An embodiment of a method of clear medium calibration for an AP in a wireless communication network comprises checking if there is enough time elapsed since a last RAW-cmc event on a wireless medium, inserting a RPS IE with a RAW slot in a RAW assigned to a calibration AID in a beacon frame when there is enough time elapsed since the last RAW-cmc event, and transmitting the beacon frame on the wireless medium to one or more STAs in the wireless communication network. The wireless medium is reserved as a quiet medium during the RAW slot in the RAW for one or more STAs to calibrate simultaneously. In some embodiments, the AP receives an association request from a STA wishing to join the wireless communication network, the AP inserts a RAW-cmc vendor IE containing the calibration AID and calibration periodicity in an association response, and transmits the association response to the STA. An embodiment of the RPS IE carries information corresponding to a start time of a RAW, a slot duration in the RAW, and a number of slots in the RAW.

In one embodiment when the AP receives a CTS-To-Self frame from a STA requesting for calibration in a quiet medium, the AP schedules a self-calibration event for the STA to calibrate, wherein the medium is inaccessible for any data transfer. In some embodiments, the AP checks if there is enough time elapsed since a last RAW-cmc event according to a dynamic maintenance interval, and the AP schedules a current RAW-cmc event for device calibration when the time elapsed since the last RAW-cmc event is greater than the dynamic maintenance interval. The AP may adaptively update the dynamic maintenance interval. An embodiment of adaptively updating the dynamic maintenance interval is to decrease the dynamic maintenance interval when an orphaned CTS-To-Self frame is received, a CTS-To-Self partial AID matches a device in the wireless communication network, an average time between the orphaned CTS-To-Self frame is less than the dynamic maintenance interval, and the dynamic maintenance interval is above a lower limit; otherwise, the dynamic maintenance interval remains unchanged. An orphaned CTS-To-Self frame is defined as having a CTS time less than a valid frame time. Another embodiment of adaptively updating the dynamic maintenance interval is to increase the dynamic maintenance interval when the dynamic maintenance interval has not decreased in the last 10 update intervals, otherwise the dynamic maintenance interval remains unchanged.

An embodiment of the present invention provides an AP connected to a wireless communication network including a receiver and transmitter, a processor, and one or more memory banks communicatively coupled to the processor and storing processor readable codes. The AP executes the processor readable codes by the processor in conjunction with the receiver and transmitter to check if there is enough time elapsed since a last RAW-cmc event, insert a RPS IE with a RAW slot assigned to a calibration AID in a beacon frame when there is enough time elapsed since the last RAW-cmc event, transmit the beacon frame to one or more STAs in the wireless communication network by the transmitter, and schedule a current RAW-cmc event for device calibration.

EXAMPLE EMBODIMENTS

FIG. 1A is a block diagram illustrating an exemplary wireless communication network 100. In some aspects, the wireless communication network 100 can be an example of a Wireless Local Area Network (WLAN). As used herein, a WLAN may be a Wi-Fi network. In some examples, the WLAN 100 can be a network implementing at least one of the IEEE 802.11 family of wireless communication protocol standards (e.g., such as that defined by the IEEE 802.11-2020 specification or amendments thereof including, but not limited to, 802.11ah, 802.11ay, 802.11ax, 802.11az, 802.11ba and 802.11be). The WLAN 100 may include at least one AP 102 and multiple associated STAs 104. For example, the STAs 104 can include a first STA 104a, a second STA 104b, a third STA 104c, a fourth STA 104d, etc. While only one AP 102 is shown, the WLAN network 100 also can include multiple APs 102.

Each of the STAs 104a-104d may be referred to as a Mobile Station (MS), a mobile device, a mobile handset, a wireless handset, an Access Terminal (AT), a User Equipment (UE), a Subscriber Station (SS), and/or a subscriber unit, among other examples. The STAs 104 may represent various devices such as mobile phones, handheld devices, netbooks, computers, tablet computers, laptops, display devices (e.g., TVs, computer monitors, navigation systems, etc.), music or other audio or stereo devices, remote control devices ("remotes"), printers, kitchen or other household appliances, key fobs (e.g., for Passive Keyless Entry and Start (PKES) systems), etc.

A single AP 102 and an associated set of STAs 104a-104d may be referred to as a Basic Service Set (BSS), which is managed by the respective AP 102. FIG. 1A additionally shows an example coverage area 106 of the AP 102, which may represent a Basic Service Area (BSA) of the WLAN 100. The BSS may be identified to users by a Service Set Identifier (SSID), as well as to other devices by a Basic Service Set Identifier (BSSID), which may be a Medium Access Control (MAC) address of the AP 102.

The AP 102 periodically broadcasts beacon frames ("beacons") including the BSSID to enable any STAs (e.g., such as one or more, or all, of the STAs 104a-104d) within wireless range of the AP 102 to associate or re-associate with the AP 102 to establish a respective communication link 108a-108d (e.g., hereinafter also referred to as a "Wi-Fi link"). For example, the first STA 104a can establish a respective communication link 108a with the AP 102, the second STA 104b can establish a respective communication link 108b with the AP 102, the third STA 104c can establish a respective communication link 108c with the AP 102, the fourth STA 104d can establish a respective communication link 108d with the AP 102, etc. The STAs 104a-104d may additionally use the beacon frames broadcast by AP 102 to maintain the respective communication link 108a-108d with the AP 102. For example, the beacons can include an identification of a primary channel used by the respective AP 102 as well as a timing synchronization function for establishing or maintaining timing synchronization with the AP 102. The AP 102 may provide access to external networks to various STAs in the WLAN via respective communication links 108.

To establish the communication links 108a-108d with an AP 102, each of the respective STAs 104a-104d can perform passive or active scanning operations ("scans") on frequency channels in one or more frequency bands. For example, to perform passive scanning, each of the STAs 104a-104d listens for beacons that are transmitted by the AP 102 at a periodic time interval referred to as the Target Beacon Transmission Time (TBTT). The TBTT can be measured in Time Units (TUs). In some examples, one TU may be equal to 1024 microseconds (μs). In some examples, the TBTT can have a default value of 102.4 milliseconds (ms). To perform active scanning, each of the STAs 104a-104d can generate and sequentially transmit probe requests on each channel to be scanned and listens for probe responses from the AP 102. Each of the STAs 104a-104d may be configured to identify or select an AP 102 with which to associate (e.g., based on the scanning information obtained through the passive or active scans), and to perform authentication and association operations to establish a respective communication link 108a-108d with the selected AP 102. The AP 102 assigns an Association Identifier (AID) to each of the STAs 104a-104d at the culmination of the association operations, which the AP 102 uses to track the STAs 104a-104d.

In some cases, one or more of the STAs 104a-104d may have the opportunity to select one of many BSSs within range of the STA or to select among multiple APs 102 that together form an Extended Service Set (ESS) including multiple connected BSSs. An extended network station associated with the WLAN 100 may be connected to a wired or wireless distribution system that may allow multiple APs 102 to be connected in an ESS. In some examples, one or more of the STAs 104a-104d can be covered by more than one AP 102 and can associate with different APs 102 at different times for transmissions. After association with an AP 102, one or more of the STAs 104a-104d also may be configured to periodically scan its surroundings to find a more suitable AP with which to associate. For example, a given one of the STAs 104a-104d that is moving away from its associated AP 102 may perform a "roaming" scan to find another AP having more desirable network characteristics (e.g., such as a greater Received Signal Strength Indicator (RSSI), a reduced traffic load, etc.).

In some cases, the STAs 104a-104d may form networks without APs 102 or other equipment other than the STAs 104a-104d themselves. One example of such a network is an ad hoc network. Some examples of an ad hoc network are mesh networks and peer-to-peer (P2P) networks. In some cases, ad hoc networks may be implemented within a larger wireless network In such implementations, while the STAs 104a-104d may be capable of communicating with each other through the AP 102 using the respective communication links 108a-108d, the STAs 104a-104d, the STAs may also communicate directly with each other using direct wireless links 110. In some examples, two STAs may communicate via a direct communication link 110 regardless of whether both STAs 104 are associated with and served by the same AP 102. In such an ad hoc system, one or more of the STAs 104a-104d may assume the role filled by the AP 102 in a BSS. Such a STA may be referred to as a Group Owner (GO) and may coordinate transmissions within the ad hoc network. Examples of direct wireless links 110 can include one or more Wi-Fi Direct connections, connections established by using a Wi-Fi Tunneled Direct Link Setup (TDLS) link, and other P2P group connections, etc.

The APs 102 and STAs 104a-104d may function and communicate using the respective communication links 108a-108d according to at least one of the IEEE 802.11 wireless communication protocol standards. These standards define the WLAN radio and baseband protocols for the physical (PHY) and Medium Access Control (MAC) layers. For example, the APs 102 and STAs 104a-104d transmit and receive wireless communications to and from one another in the form of PHY Protocol Data Units (PPDUs) or Physical Layer Convergence Protocol (PLCP) PDUs. The APs 102 and STAs 104a-104d in the WLAN 100 may transmit PPDUs over a license or unlicensed spectrum, which may be a portion of spectrum that includes frequency bands traditionally used by Wi-Fi technology, such as the 2.4 GHz band, the 5 GHz band, the 60 GHz band, the 3.6 GHz band, and the sub-1 GHz band. Some implementations of the APs 102 and STAs 104a-104d described herein also may communicate in other frequency bands, such as the 6 GHz band, which may support both licensed and unlicensed communications. The APs 102 and STAs 104a-104d also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11 standards and specifications may be transmitted over frequency bands that are divided into multiple 20 MHz channels. In such examples, the PPDUs are transmitted over a physical channel having a minimum bandwidth of 20 MHz, although other channel bandwidths are also possible. In some cases, a larger bandwidth channel can be formed using channel bonding, which bonds together multiple channels each of the minimum bandwidth.

Each PPDU is a composite structure that includes a PHY preamble and a payload in the form of a PHY Service Data Unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figures 2A, 2B:
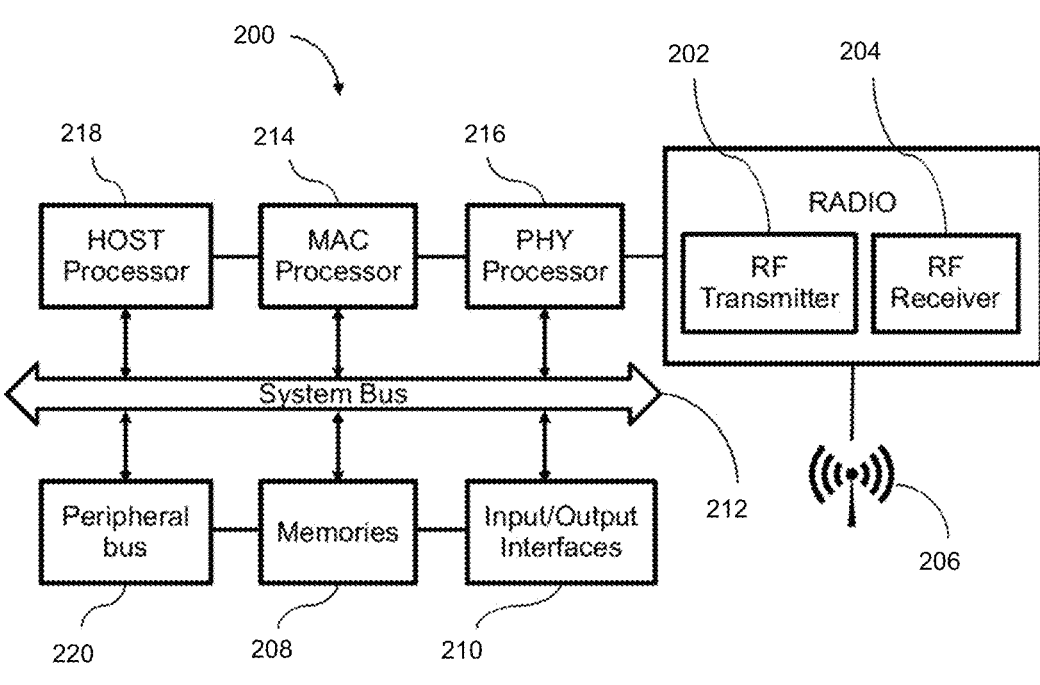
FIG. 2A is a block diagram of a wireless communication device that can implement a station (STA) or access point (AP), in accordance with some embodiments.
FIG. 2B is a schematic block diagram of the receiver data flow architecture of the wireless communication device of FIG. 2A, in accordance with some embodiments.

FIG. 2A is a high-level block diagram of an exemplary wireless communication device 200 that can be used to implement a STA or an AP, in some examples. The wireless communication device 200 can include a MAC layer and a PHY layer in accordance with one or more of the IEEE 802.11 standards.

The wireless communication device 200 includes a Radio Frequency (RF) transmitter module 202, an RF receiver module 204, an antenna unit 206, one or more memory banks 208, input and output interfaces 210, and system bus 212. The RF transmitter module 202 and the RF receiver module 204 include a modem (modulator-demodulator device), which transmits data by modulating one or more carrier wave signals to encode digital information, as well as receives data by demodulating the signal to recreate the original digital information. As illustrated, the wireless communication device 200 further includes a MAC processor 214, a PHY processor 216 and a HOST processor 218. These processors can be any type of Integrated Circuit (IC) including a general processing unit, an Application Specific Integrated Circuit (ASIC) or Reduced Instruction Set Computer-Five (RISC-V) based ICs, amongst others.

The memory 208 can be used to store software and/or computer-readable instructions, including software or instructions that can be used to implement at least some functions of the MAC layer. For example, each processor included in the wireless communication device 200 (e.g., MAC processor 214, PHY processor 216, HOST processor 218, etc.) executes respective software to implement the functions of the respective communication/application layer.

The PHY processor 216 includes a transmitting signal processing unit and a receiving signal processing unit (not shown) and can be used to manage the interface with the Wireless Medium (WM). The PHY processor 216 operates on PPDUs by exchanging digital samples with the radio module which includes the RF transmitter 202, the RF receiver 204, analog-to-digital converters, and digital filters.

The MAC processor 214 executes MAC level instructions and manages the interface between the application software and the WM, through the PHY processor 216. The MAC processor 214 is responsible for coordinating access to the WM so that the Access Point (AP) and STAs in range can communicate effectively. The MAC processor 214 adds header and tail bytes to units of data provided by the higher levels and sends them to the PHY layer for transmission. The reverse happens when receiving data from the PHY layer. If a frame is received in error, the MAC processor 214 manages the retransmission of the frame.

The HOST processor 218 interfaces with the MAC layer and is responsible for running higher level functionalities of the wireless communication device.

The PHY processor 216, the MAC processor 214, the HOST processor 218, the peripheral bus 220, the memories 208, and the input/output interfaces 210 communicate with each other via the system bus 212. The peripheral bus 220 connects to a number of peripherals that support core functions of the wireless communication device 200, including timers, interrupts, radio/filters/system registers, counters, UART, GPIO interfaces, among others. The memory 208 may further store an operating system and applications. In some examples, the memory may store recorded information about captured frames and packets. The input/output interface unit 210 allows for exchange of information with a user of the wireless communication device. The antenna unit 206 can include a single antenna and/or can include multiple antennas. For example, multiple antennas can be used to implement Multiple Input Multiple Output (MIMO) techniques, among others.

FIG. 2B illustrates a schematic block diagram of a receiver data flow architecture 250 that can be used to receive Wi-Fi packets over the network. In one illustrative example, the receiver data flow architecture 250 illustrated in FIG. 2B can correspond to or otherwise be associated with the wireless communication device 200 illustrated in FIG. 2A. Radio signals are received over the WM and translated into electrical signals by the receiving antenna 252 (e.g., which can be the same as or similar to antenna 206). The received signal is conditioned using a series of analog filters 254 (e.g., depicted as analog RF receiving (Rx) filters) before being converted into a digital signal equivalent using an Analog-to-Digital Converter (ADC) 256. The sampled signal output of ADC 256 is conditioned again using a filter bank 258, which can include one or more digital RF filters and/or a farrow, before the samples are collected in an asynchronous receiving First-In-First-Out (FIFO) data structure 260.

Samples in FIFO structure 260 can be accessed by a plurality of modules. For example, samples can be accessed by a packet detect module and a sub-band module, both of which may be included in the lower-level PHY portion 262 depicted in FIG. 2B. In some embodiments, the lower-level PHY portion 262 is itself included in the PHY processor 216 illustrated in FIG. 2A.

The packet detect module included in the lower-level PHY portion 262 can include hardware and/or implement algorithms that can be used to analyze the initial sections of the PPDU in the time domain. Based on the analysis, the packet detect module can be used to recognize a received frame and synchronize frequency and timing of the wireless communication device with the packet being received. The sub-band module included in the lower-level PHY portion 262 can include hardware and/or implement algorithms that can be used to detect which subchannel in the allocated frequency band is being used for the packet being received.

Once a packet is detected and the relevant subchannel is established, samples can be forwarded to an upper-level PHY portion 264. The upper-level PHY portion 264 can be included in the PHY processor 216 illustrated in FIG. 2A. In some aspects, upper-level PHY portion 264 can be used to process and decode Orthogonal Division Multiplexing (OFDM) symbols (e.g., with the support of a coprocessor module) to reconstruct the full PPDU. The reconstructed PPDU is output by the upper-level PHY portion 264 and subsequently processed by the MAC layer processor 266. The MAC layer processor 266 can be used to extract the data payload from the PPDU and provide the relevant information to the HOST layer 268 for consumption.

In some examples, the MAC layer processor 266 illustrated in FIG. 2B can be the same as or similar to the MAC processor 214 illustrated in FIG. 2A. In some cases, the HOST layer 268 illustrated in FIG. 2B can include or otherwise can be the same as or similar to the HOST processor 218 illustrated in FIG. 2A.

Figure 2C:
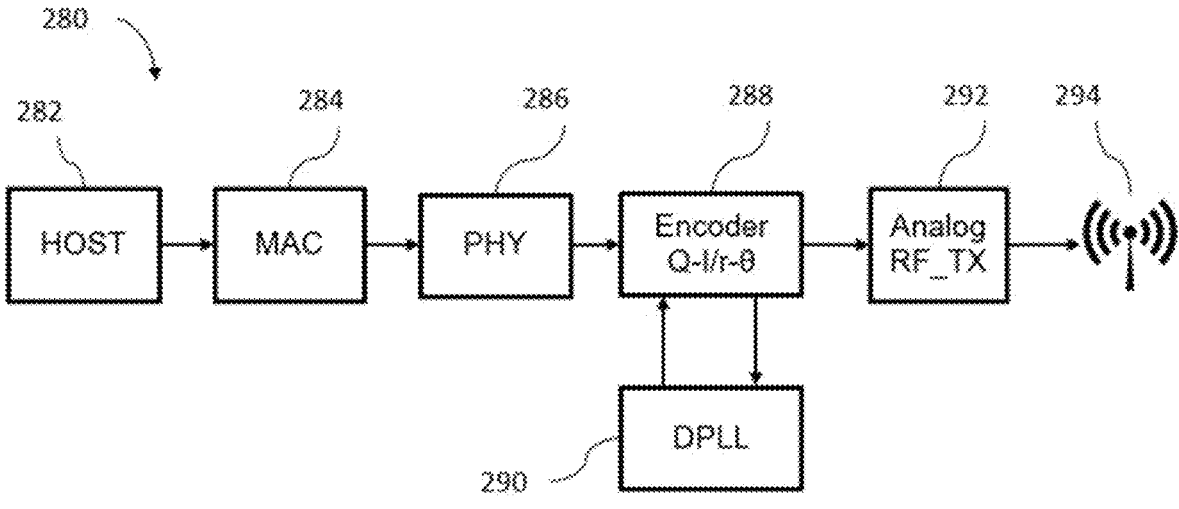
FIG. 2C is a schematic block diagram of a transmitter data flow architecture that can be used to transmit Radio Frequency (RF) signals over a wireless medium, in accordance with some embodiments.

FIG. 2C is a schematic block diagram of a transmitter data flow architecture 280 that can be used to transmit RF signals over a wireless medium, in accordance with some examples. More particularly, FIG. 2C illustrates a simplified schematic block diagram of a transmitter data flow architecture 280 used for transmitting radio signals over a WM. Data can be generated from a HOST or APP module 282 and packaged in a MAC level Protocol Data Unit (MPDU) to be routed over the wireless network by the MAC management module 284. The PHY module 286 interfaces with the WM and compiles a PPDU by adding a PHY preamble and the tail to the MPDU. Usually a Modulation Coding Scheme (MCS) for transmission of the packet over the medium is established using a rate control algorithm by the MAC module 284 or the PHY module 286. The modulation scheme selected can define the modulation technique to be used to transmit the data on the WM and the coding rate. Based on the modulation scheme selected, for example Quadrature Amplitude Modulation (QAM) 64, the PPDU is modulated to be transmitted on the WM. The encoder module 288 generates signals corresponding to points of QAM constellation symbols (groups of bits of the PPDU) which can be encoded using polar (r-θ) or cartesian (Q-I) coordinates. The modulation is done by linking the encoder module 288 to a Digital Phase Lock Loop (DPLL) 290. The modulated signals may be filtered by analog filters 292 and transmitted using a transmitting antenna 294.

Embodiments of the present disclosure utilize of a new MAC-layer feature introduced in IEEE 802.11ah HaLow, known as Restricted Access Window (RAW), for coordination of quiet medium self-calibration. As used herein, the technique of coordinating a quiet medium for self-calibration through the RAW feature can be referred to as "RAW clear medium calibration" and/or "RAW-cmc". The RAW feature is designed for applications where the network supports a number of synchronous streams, for example, multiple video cameras associated with one AP. A RAW is an interval during which uplink channel access is permitted or enabled for only a subset of STAs within an assigned RAW group. STAs that are not in the subset corresponding to assigned RAW group are prohibited from transmission within the RAW scheduled for the assigned RAW group. To further reduce simultaneous contention, channel access attempts can be spread over multiple slots within the entire RAW duration. An assigned STA or a subset of STAs can access the wireless medium within a slot using Enhanced Distributed Channel Access (EDCA). In an assigned slot within a RAW, a STA may restrict its transmission within the slot duration, or, if permitted, may cross the slot boundary in order to continue with its transmission. Slot assignment among the assigned STAs within the RAW is based on a Traffic Indication Map (TIM) element in a beacon frame transmitted from an AP to the STAs. The AP may also assign specific slots to individual STAs and/or to various subsets of STAs for uplink and/or downlink traffic by indicating the slot assignment in a Resource Allocation frame that is transmitted at the beginning of a RAW.

The beacon frames are a type of management frame that contain information about the network. Beacon frames are transmitted periodically to announce the presence of a network, synchronize the members of a service set, and signal the presence of buffered data traffic for members of the service set. A RAW Parameter Set (RPS) Information Element (IE) can be transmitted in beacon frames to adver- tise to all clients that there will be a RAW. Clients are not allowed to transmit during the RAW unless the client is included in this specific RAW group indicated in the RPS IE The RPS IE can additionally provide information indica- tive of clients within the specific RAW group that are permitted to transmit in the RAW. For example, each client in the specific RAW group can be aware of the availability of the slot for the respective client to transmit, based on a Timer Synchronization Function (TSF) setup. The RPS IE format defined by the HaLow specification is shown in FIG. 3A, described below.

FIG. 3A is a diagram illustrating an example of the format of the RPS IE 300 defined by the IEEE 802.11ah HaLow specification, in accordance with some examples. As illus- trated, the RPS IE 300 includes an element ID field 302 (in some embodiments, one octet in length), a length 304 field (in some embodiments, one octet in length), and a RAW assignments 306 field (in some embodiments, of a variable length)

Each RPS IE 300 may have multiple RAW assignment fields 306 to describe the configuration of multiple RAWs between two beacon frames. The RAW assignment subfield format 306b shown in FIG. 3B can be the same as or similar to the RAW assignment field 306 of FIG. 3A. In particular, FIG. 3B is a diagram illustrating an example of a RAW assignment subfield format 306b that may be associated with the RPS IE format 300 of FIG. 3A, in accordance with some examples. The RAW assignment field 306b may always include at least a RAW control 322 and a RAW slot definition 324 subfield. The RAW assignment field 306b may optionally include one or more of RAW start time 326, RAW group 327, channel indication 328, and/or periodic operation parameters 329 subfields.

FIG. 3C further illustrates the RAW control subfield 322 of FIG. 3B, and in particular, FIG. 3C depicts an example of a RAW control subfield 322c that can be the same as or similar to the RAW control subfield 322 of FIG. 3B, in accordance with some examples. In some aspects, the RAW control subfield 322 of FIG. 3B/322c of FIG. 3C carries information such as RAW type 342, RAW type options 343, start time indication 344, RAW group indication 345, chan- nel indication presence information 346, and/or periodic RAW indication information 347.

FIG. 3D illustrates the RAW slot definition subfield format (e.g., the RAW slot definition 324 of FIG. 3B), and depicts a RAW slot definition subfield format 324d that in some embodiments can be the same as or similar to the RAW slot definition subfield 324 of FIG. 3B. As illustrated, the RAW slot definition subfield 324 of FIG. 3B/324 of FIG. 3D can carry (e.g., be indicative of) information such as slot definition format indication 352, cross slot boundary 354, slot duration count 356, and/or number of slots 358.

In some embodiments of RAW clear medium calibration (RAW-cmc), an AP specifies a RAW calibration service period in an RPS IE of a beacon frame through setting a pre-selected calibration Association ID (AID) range for self-calibration. The AP ensures that the pre-selected cali- bration AID denoting the RAW calibration service period is not assigned to any STA in the Basic Service Set (BSS). The AP assigns a unique AID to a STA successfully associated with the AP. In some embodiments, the pre-selected cali- bration AID can be set to a static value at the higher range of allowed AIDs. When an AP receives an association request from a STA, the AP inserts information regarding the pre-selected calibration AID for self-calibration and calibra- tion periodicity in an association response, and transmits the association response to the STA.

The AP then uses a beacon frame to advertise the RAW for device calibration. For instance, the AP can utilize an RPS IE with a single RAW slot assigned to the pre-selected calibration AID within a beacon frame. STAs within the BSS associated with the AP receive the beacon frame containing the information of the RAW. These STAs can then schedule a quiet medium self-calibration according to the RAW start time, without the STAs having to reserve the wireless medium. A STA not supporting this RAW calibration feature will stay out of the service period due to the nature of RAW and the requirement to comply with the RAW feature.

In some embodiments, quiet self-calibration may include PHY calibration. In one illustrative example, quiet self- calibration/PHY calibration can include one or a combina- tion of Direct Current (DC) calibration and In-phase Quadrature (IQ) calibration, among various others. In some aspects, DC calibration can be performed based on measur- ing IQ samples in radio signals received by the STA, calculating an average, mean, or medium of the IQ samples, and reducing the portion of DC component in the radio signals by adjusting amplifier settings. In some examples, IQ calibration can be performed based on sending a tone through a transmitter (Tx) of the STA, detecting any differ- ence between the I and Q components by an envelope detector of the STA, and reducing the difference between the I and Q components by adjusting phase or amplitude coef- ficients. DC calibration may be performed to find optimum values for the settings, parameters, and/or coefficients for minimizing the DC component that goes into the system. Similarly, IQ calibration can be performed to find optimum values for the setting, parameters, and/or coefficients for minimizing the IQ difference.

Figure 4:
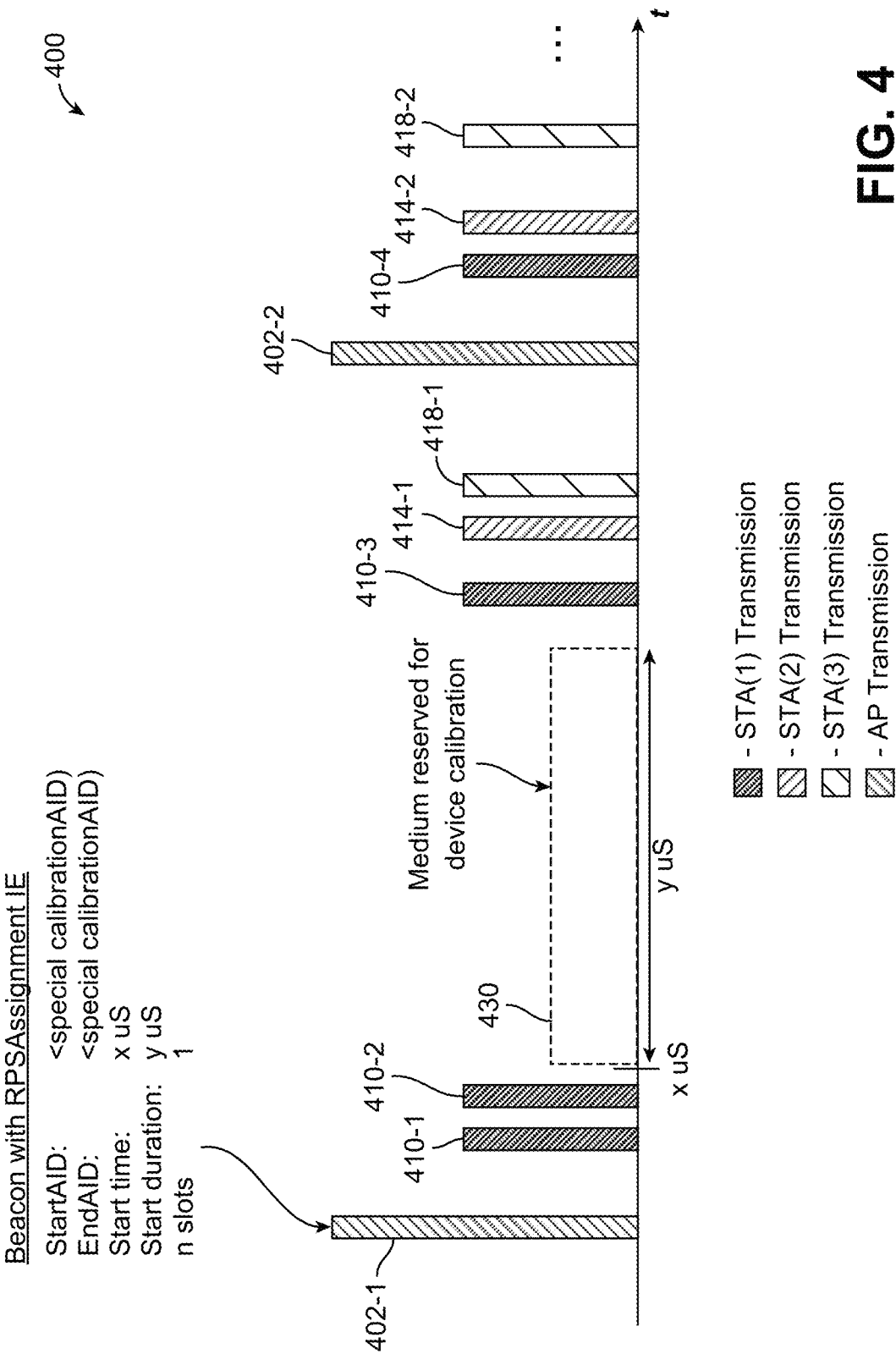
FIG. 4 is a diagram illustrating an example of clear medium calibration (CMC) that can be used to reserve a wireless medium for self-calibration using the RAW feature, in accordance with some embodiments.

The disclosure turns next to FIG. 4, which is a diagram illustrating an example of Clear Medium Calibration (CMC) 400 that can be used to reserve a wireless medium for self-calibration using the RAW feature, in accordance with some embodiments. For instance, FIG. 4 depicts an embodi- ment of a RAW-cmc technique which reserves a wireless medium for self-calibration through the use of the RAW. The horizontal axis in the graph 400 of FIG. 4 represents time, shown here in units of microseconds (μs). The vertical axis of the graph 400 of FIG. 4 represents the power of signals transmitted in the wireless medium.

In this embodiment, an AP sends beacon frames by AP transmissions 402-1 and 402-2; a first STA sends data by STA(1) transmissions 410-1, 410-2, 410-3, 410-4; a second STA sends data by STA(2) transmissions 414-1, 414-2; and a third STA sends data by STA(3) transmissions 418-1, 418-2.

In one illustrative example, an AP can be configured to transmit a beacon frame 405 that includes an RPS IE indicative of information corresponding to a RAW sched- uled for self-calibration. For instance, the first AP transmis- sion 402-1 includes the beacon frame 405. In some embodi- ments, both the start AID and end AID for the RAW are set to equal to the pre-selected calibration AID for self-calibra- tion (e.g., configured for and/or otherwise indicated to each STA associated with the AP).

In this example, the start time of the RAW is set to x microseconds (μs), the slot duration of the RAW is set to y us, and the number of slots in the RAW is set to 1. In the example clear medium calibration shown in diagram 400 of FIG. 4, the first device STA(1) has two transmissions before the RAW starting time at x µs (e.g., first STA(1) transmission 410-1 and second STA(1) transmission 410-2).

Subsequently to the RAW start time at x µs, the wireless medium is reserved to be a quiet medium for self-calibration during the RAW, to thereby allow STAs associated with the AP to perform simultaneous self-calibration. The RAW 430 shown in FIG. 4 corresponds to the quiet medium reserved time during which the wireless medium is reserved for device calibration. After the RAW 430 end time (e.g., equal to the RAW start time at x µs+number of RAW slots * RAW slot duration), devices associated with the AP such as STA(1), STA(2), and STA(3) are allowed to once again transmit on the wireless medium, for instance as depicted in FIG. 4 as the series of transmissions 410-3, 414-1, 418-1, 402-2, 410-4, 414-2, 418-2, . . . , etc.

FIGS. 5A-5G depict flow diagrams illustrating respective embodiments of the presently disclosed systems and techniques for RAW clear medium calibration coordination. In some aspects, the processes 500a of FIG. 5A, 500c of FIG. 5C, 500f of FIG. 5F, and/or 500g of FIG. 5G can be implemented by an AP. In some aspects, the processes 500b of FIG. 5B, 500d of FIG. 5D, and 500e of FIG. 5E can be implemented by one or more STAs associated with the AP.

Figure 5A:
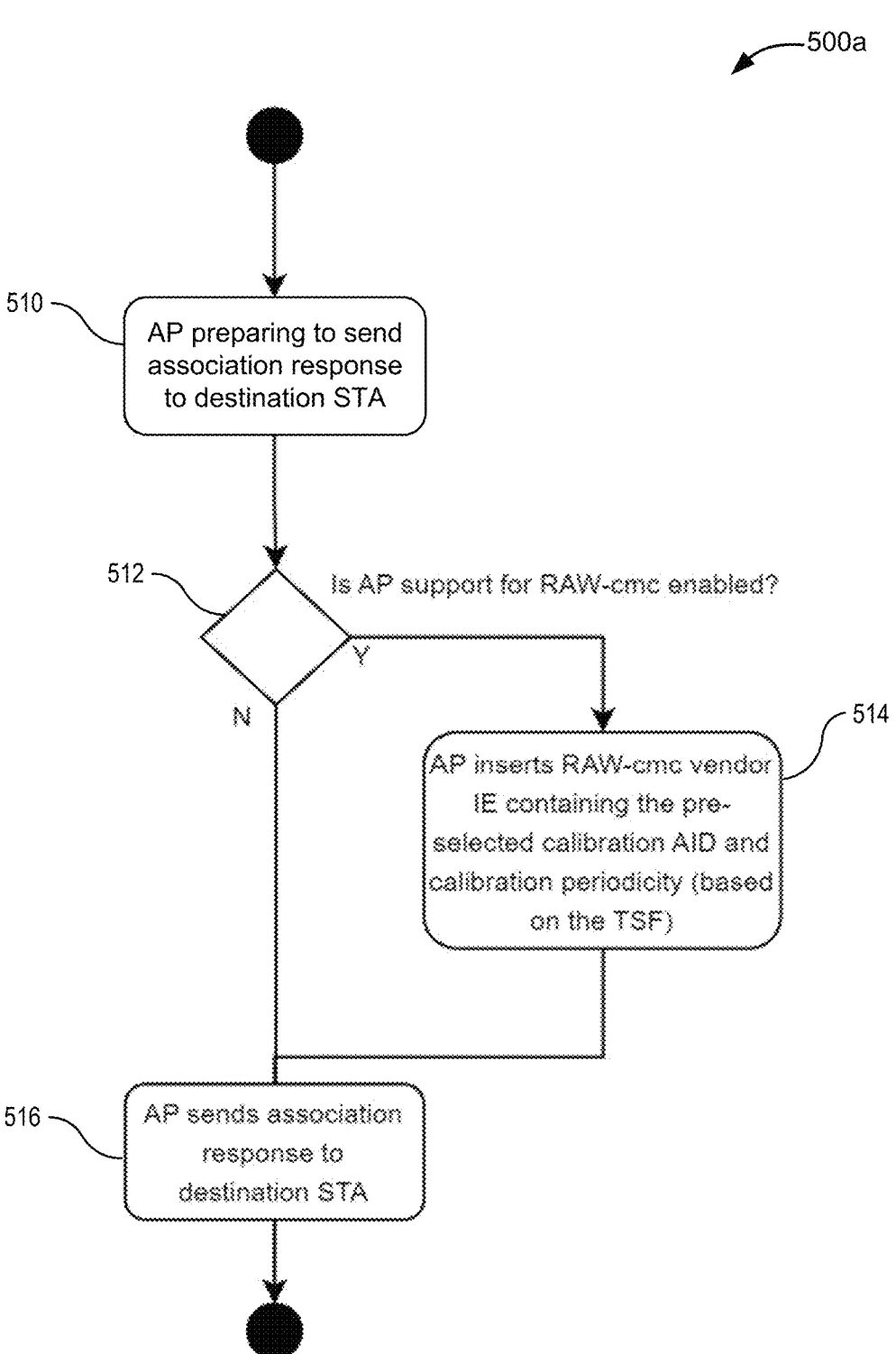
FIG. 5A is a flow diagram of an exemplary wireless communication method implemented by an AP to perform RAW-based clear medium calibration (RAW-cmc) by advertising support for RAW-cmc in association response frames to destination STAs, in accordance with some embodiments.

FIG. 5A is a flow diagram of a process 500a of wireless communication implemented by an AP to perform RAW-based clear medium calibration (RAW-cmc), wherein the AP is configured to advertise support for RAW-cmc in association response frames transmitted to destination STAs, in accordance with some embodiments.

In one illustrative example, AP support for the RAW-cmc method can be communicated or otherwise signaled to the STAs associated with the AP using one or more vendor IEs with a predetermined structure that is recognized by supporting devices (e.g., STAs), wherein the vendor IE is indicative of the AP being enabled to support the RAW-cmc method for self-calibration by the STAs. For example, the vendor IE used to indicate RAW-cmc support by the AP can be provided as a RAW-cmc vendor IE.

In the process 500a of FIG. 5A, an AP can receive an association request from a STA and can, at block 510, prepare to send an association response to the STA (also referred to as the destination STA).

At block 512, a determination is made whether AP support for RAW-cmc is enabled. The AP may or may not support the RAW-cmc method. In some embodiments, the AP supporting the RAW-cmc method may adaptively enable or disable the RAW-cmc feature.

In cases when the RAW-cmc method is supported and is enabled by the AP (e.g., the 'Y' or yes branch from decision block 512), the AP inserts, into the association response to the association request from the destination STA, a RAW-cmc vendor IE indicative of a pre-selected calibration AID and calibration periodicity based on the Time Synchronization Function (TSF). The RAW-cmc vendor IE can be the vendor IE recognized by and configured for the STAs supporting the RAW-cmc method, as described above. The calibration periodicity indicates how often the AP will schedule a quiet time for device calibration.

In some embodiments, STAs may be configured at the time of association (e.g., in the association request transmitted to an AP at block 510, or in response to receiving an association response from the AP at block 516) to signal to the AP one or more clear-medium calibration requirements or parameters corresponding to that particular STA. For instance, at the time of association with an AP, a STA can signal clear-medium calibration requirements such as a periodicity and a typical calibration duration required or implemented by the STA.

In some embodiments, the STA-specific clear-medium calibration requirements can be signaled to the AP at the time of association using a vendor IE transmitted from the STA to the AP. Upon receiving, from the STA and at the time of association, signaling that includes the STA's vendor IE indicative of the STA-specific clear-medium calibration requirements, the AP can be configured to store the information locally.

Subsequently, the AP can be configured to determine one or more aggregate values and/or aggregate information from a plurality of vendor IEs transmitted from STAs to the AP at their respective times of association. For example, the AP can aggregate the STA-specific clear-medium calibration requirements and/or vendor IEs received by the AP from some or all of a plurality of STAs that have associated with the AP and to the same BSS.

In one illustrative example, the AP can analyze the aggregate information determined from the STA-specific clear-medium calibration requirements or parameters to determine, select, or otherwise configure an optimal periodicity and/or duration of the RAW-cmc vendor IE that the AP inserts into the association response at block 514 (e.g., the AP determines the optimal periodicity and/or duration for the RAW-cmc vendor IE that is inserted into the association response at block 514 and that is then transmitted to the STA at block 516). In some embodiments, the AP can statically determine the optimal periodicity and/or duration of the RAW-cmc vendor IE inserted into the association response based on the aggregate STA-specific CMC requirements, and/or the AP can dynamically determine the optimal periodicity and/or duration of the RAW-cmc vendor IE inserted into the association response based on the aggregate STA-specific CMC requirements. For instance, the AP may dynamically vary one or more of the periodicity and duration of the RAW-cmc vendor IE inserted into the association response at block 514 based on the differing STA-specific requirements of the STAs that may associate to the AP.

At block 516, the AP transmits the association response to the destination STA, which is the STA from which the AP received the original association request at block 510, as described above. If RAW-cmc is not supported or enabled by the AP, the process 500a can proceed from block 512 to block 516, without performing block 514 to insert the RAW-cmc vendor IE into the association response (e.g., the 'N' or No branch from decision block 512).

Figure 5B:
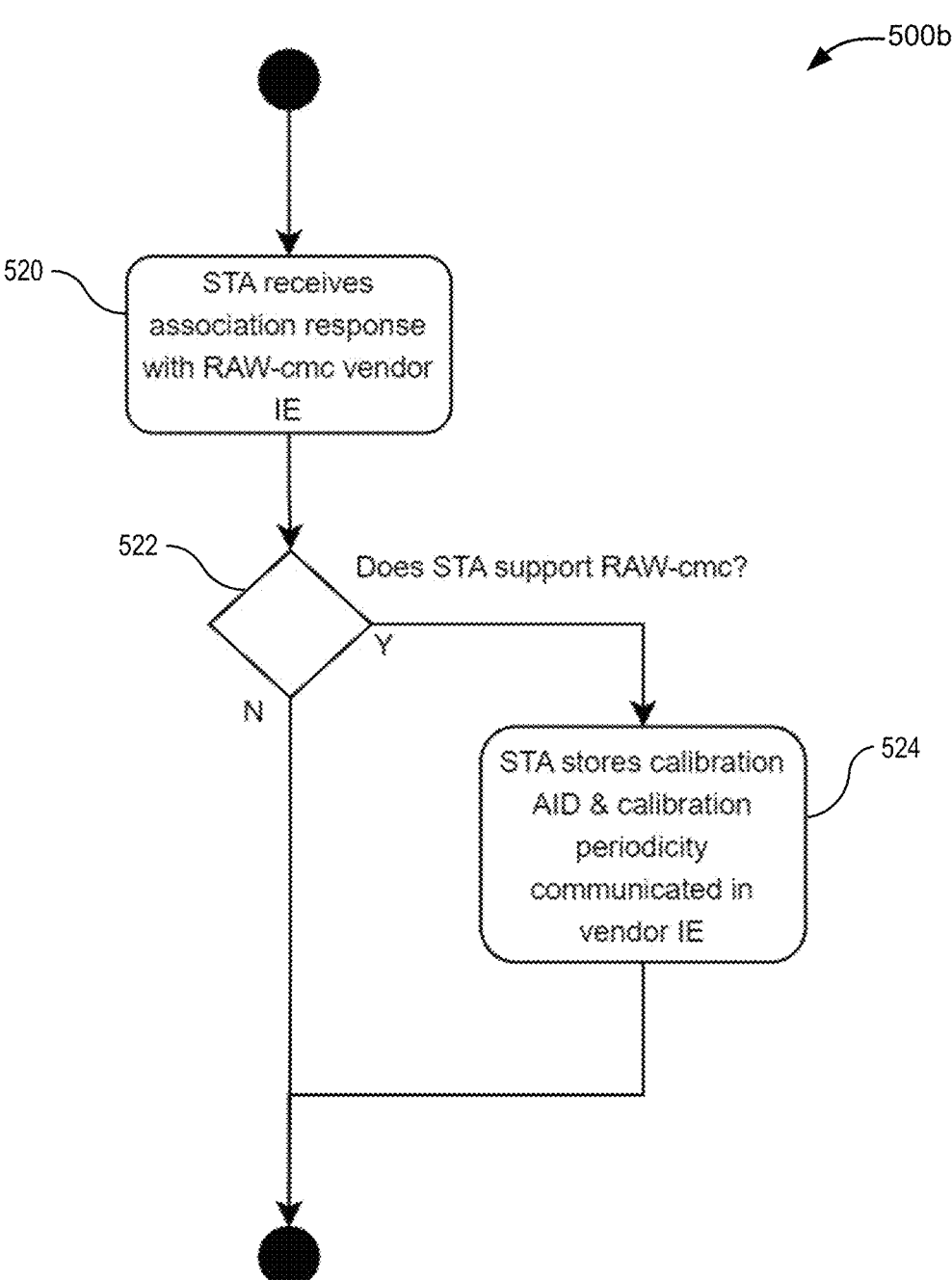
FIG. 5B is a flow diagram of an exemplary method of RAW-cmc implemented by a STA based on receiving from an AP an association response indicative of a RAW-cmc vendor IE, in accordance with some embodiments.

FIG. 5B is a flow diagram of a process 500b of RAW-cmc implemented by a STA based on receiving from an AP an association response indicative of a RAW-cmc vendor IE, in accordance with some embodiments.

At block 520, a STA receives an association response from an AP that received the earlier association request transmitted by the STA. The association response received by the STA at block 520 can include, contain, and/or otherwise be indicative of the RAW-cmc vendor IE in accordance with an embodiment.

At block 522, a determination is made as to whether the STA supports RAW-cmc and/or whether RAW-cmc is enabled for the STA. If the STA determines that it does support RAW-cmc and the RAW-cmc function is enabled, the process 500b proceeds to block 524, where the STA can obtain and store the pre-selected calibration AID and calibration periodicity indicated/included within the RAW-cmc vendor IE of the association response received by the STA from an AP at block 520. In cases when the STA does not support RAW-cmc or this RAW-cmc function is disabled, the process 500*b* terminates.

Figure 5C:
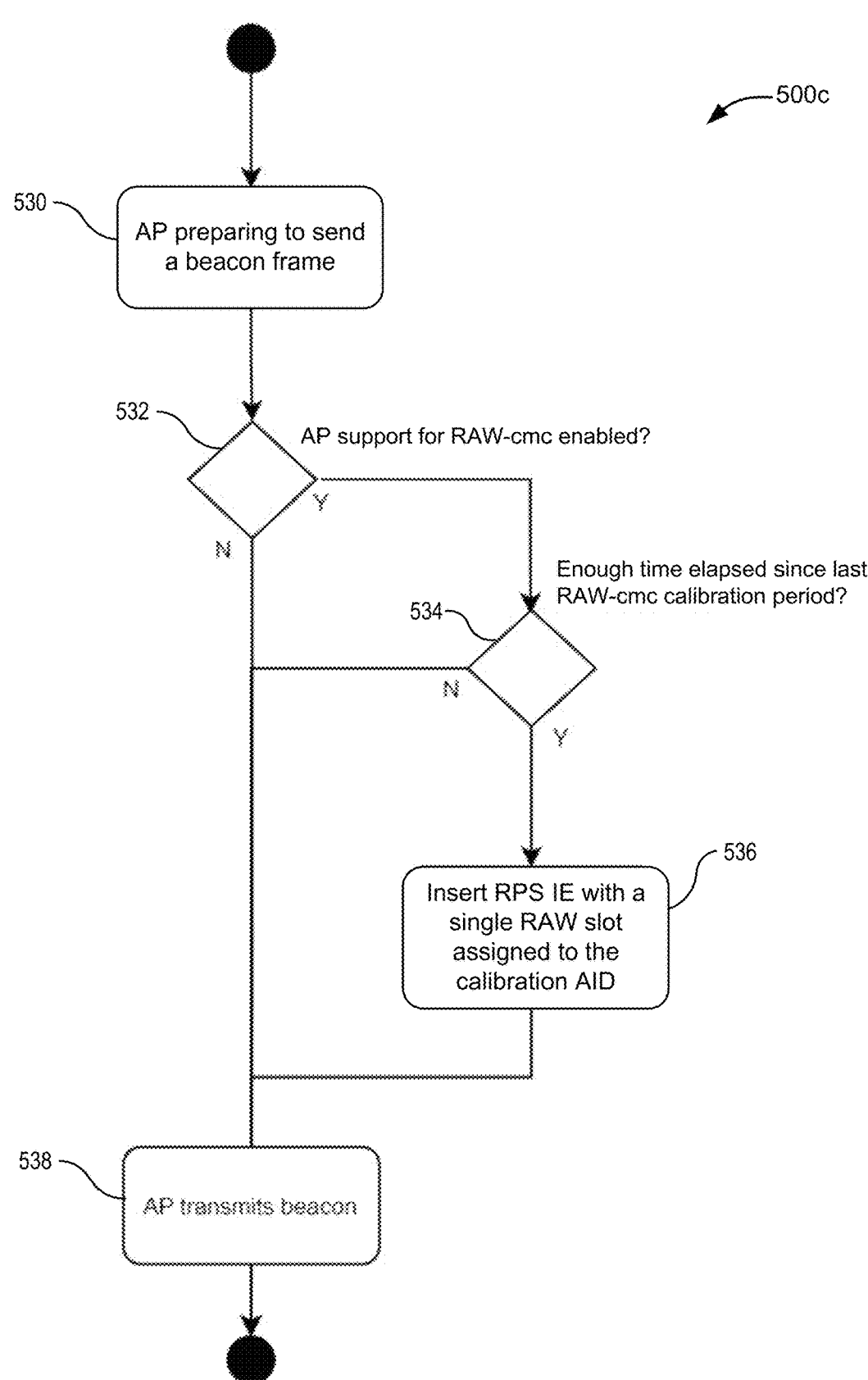
FIG. 5C is a flow diagram of an exemplary wireless communication method implemented by an AP to perform RAW-cmc, where the AP initiates a coordinated quiet medium calibration window based on an RPS IE including a pre-selected calibration Association Identifier (AID), in accordance with some embodiments.

FIG. 5C is a flow diagram of a process 500*c* of wireless communication implemented by an AP to perform RAW-cmc, where the AP initiates a coordinated quiet medium calibration window based on an RPS IE including a pre-selected calibration Association Identifier (AID), in accordance with some embodiments. For example, the RPS IE of process 500*c* can be a RPS IE defined by the IEEE 802.11ah HaLow, and may be the same as or similar to the RPS IE format 300 of FIG. 3A.

The process 500*c* of FIG. 5C depicts an example where the AP initiates a coordinated quiet medium calibration window by transmitting a beacon frame with the RPS IE indicative of the pre-selected calibration AID, in accordance with at least one embodiment. At block 530, the AP is preparing to send a beacon frame.

At block 532, the AP checks if the RAW-cmc method is supported and enabled before transmitting the beacon frame. If RAW-cmc is not supported or is disabled, the process 500*c* can proceed from decision block 532 directly to block 538 (e.g., via the 'N' branch from decision block 532), where the beacon frame is transmitted by the AP.

If the AP determines at block 532 that the RAW-cmc method is supported and enabled by the AP, the process 500*c* can proceed from decision block 532 (e.g., via the 'Y' branch from decision block 532) to the additional decision block 534, where the AP further checks whether there is enough time elapsed since the last RAW used for self-calibration. For example, a maintenance interval of 60 seconds may be configured as the minimum time interval between two RAW-cmc events.

If the AP determines that not enough time has elapsed since the last RAW-cmc calibration period, for example, if the elapsed time from the last RAW-cmc calibration period is less than 60 seconds, the process 500*c* can proceed directly from the additional decision block 534 to the AP transmitting the beacon frame at block 538, via the 'N' branch from decision block 534.

If the AP determines at block 534 that there is enough time elapsed since the last RAW-cmc calibration period, then the process 500*c* can proceed (e.g., via the 'Y' branch from decision block 534) to block 536.

At block 536, the AP inserts an RPS IE with a single RAW slot in a RAW assigned to the pre-selected calibration AID in the beacon frame according to this embodiment.

After inserting the RPS IE into the beacon frame, the AP can proceed to block 538 and transmits, on the wireless medium, the beacon frame with the RPS IE included.

Figure 5D:
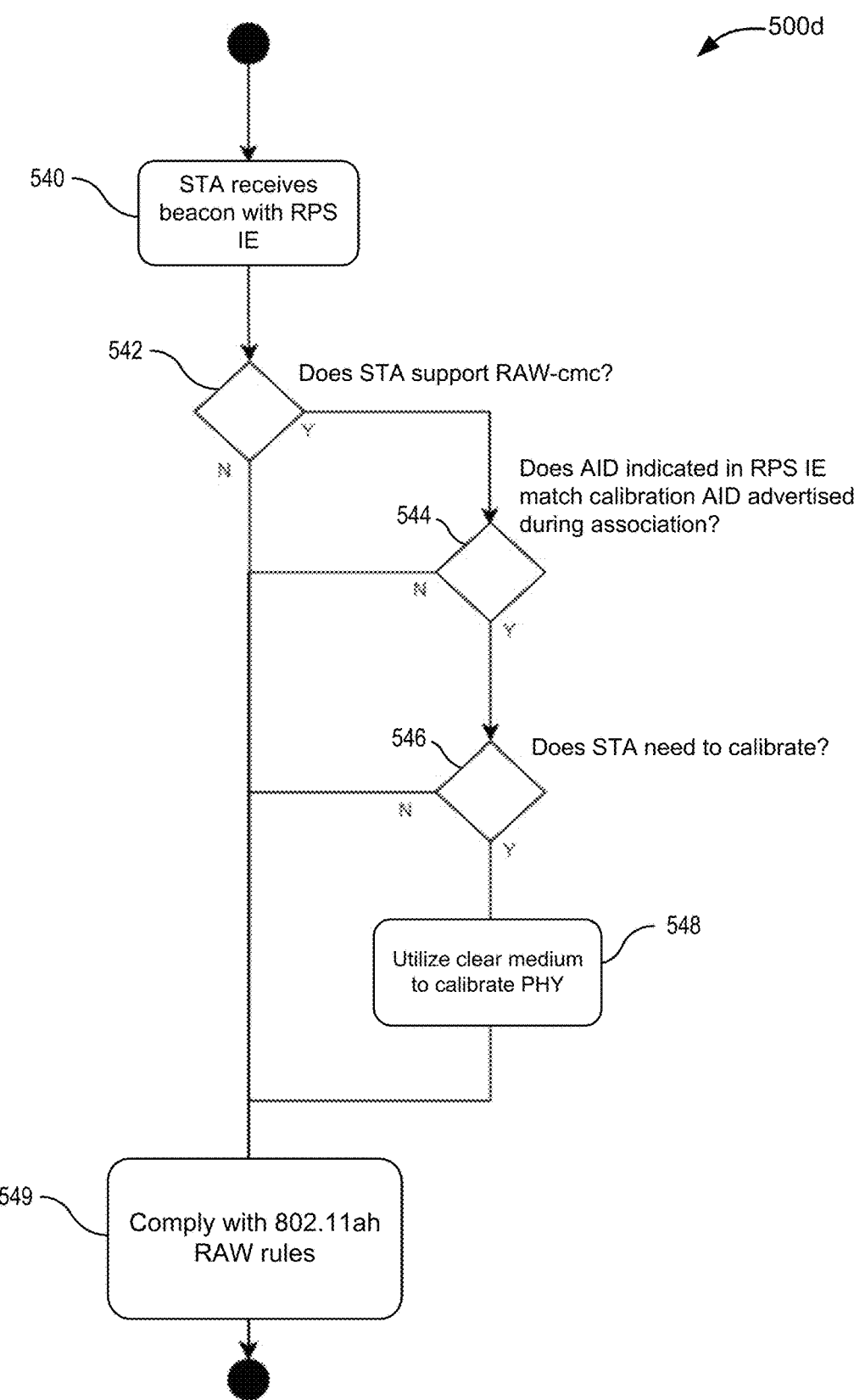
FIG. 5D is a flow diagram of an exemplary method of RAW-cmc implemented by a STA based on receiving from an AP a beacon frame that includes an RPS IE indicative of an AID, in accordance with some embodiments.

FIG. 5D is a flow diagram of a process 500*d* of RAW-cmc implemented by a STA based on receiving from an AP a beacon frame that includes an RPS IE indicative of an AID, in accordance with some embodiments.

For instance, at block 540, the STA receives a beacon frame containing an RPS IE indicative of an AID, according to an embodiment. In particular, the STA receives the beacon frame with the RPS IE at block 540, and subsequently performs one or more of the following checks: at block 542, checks whether the STA supports the RAW-cmc method; at block 544, checks whether the AID communicated in the RPS IE matches the pre-selected calibration AID advertised by the AP during association; and at block 546, checks whether the STA needs to calibrate.

If the STA determines an answer of 'No' at any of the decision blocks 542, 544, or 546, the process 500*d* exits the decision tree via a respective 'N' branch from the decision block 542, 544, or 546, and proceeds directly to block 549, where the STA is configured to comply with (e.g., respect/follow/obey) the 802.11ah-specified rules for STA behavior during the RAW time period or window.

If the STA determines that it supports the RAW-cmc method (e.g., 'Y' branch from decision block 542), determines that the AID in the RPS IE matches the pre-selected calibration AID (e.g., 'Y' branch from decision block 544), and determines that the STA needs to calibrate (e.g., 'Y' branch from decision block 546), then the STA can proceed to block 548 of process 500*d*.

At block 548, the STA can be configured to perform PHY calibration utilizing the quiet medium reserved during the RAW specified in the RPS IE of the received beacon frame, for instance in a manner the same as or similar to that described previously above. For example, at block 548, the STA can perform PHY calibration using the RAW that is the same as or similar to the RAW 430 reserved for device calibration in the example 400 of FIG. 4.

At block 549 of FIG. 5D, even if the STA does not perform self-calibration during the RAW, it will not transmit on the wireless medium to comply with the RAW rules.

Figure 5E:
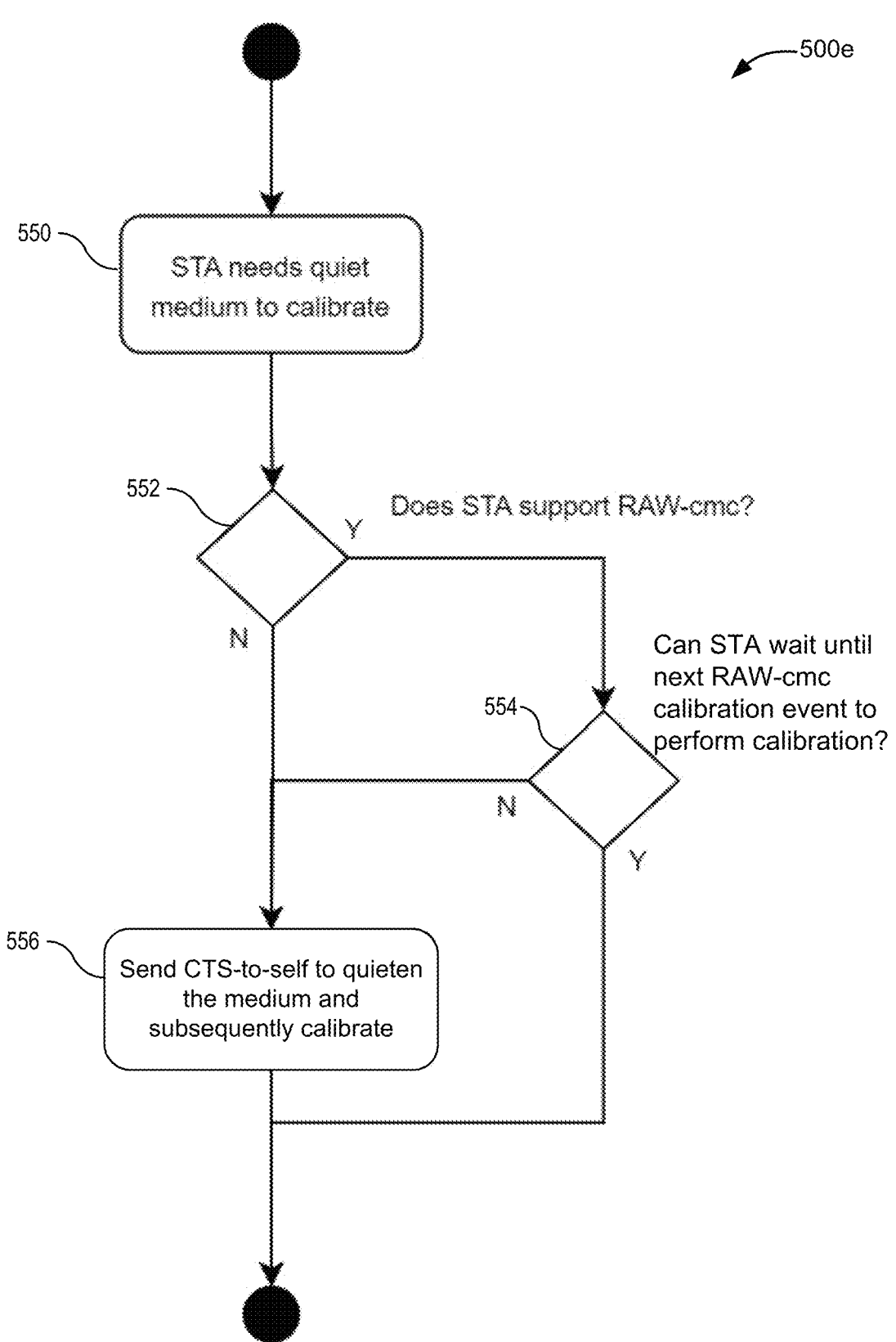
FIG. 5E is a flow diagram of an exemplary calibration method implemented by a STA which may perform calibration using a quiet medium outside of a RAW, in accordance with some embodiments.

FIG. 5E is a flow diagram of an example process 500*e* implemented by a STA to perform calibration using a quiet medium, in accordance with some embodiments. In particular, the flow diagram 500*e* of FIG. 5E illustrates the example scenario where a STA may perform PHY calibration outside of a RAW scheduled by the RAW-cmc method, according to at least one embodiment.

At block 550, the STA determines that the STA needs a quiet medium to perform calibration. At block 552, the process 550*e* includes determining or checking whether the RAW-cmc method is supported when the STA needs a quiet medium for self-calibration. If the STA supports RAW-cmc (e.g., 'Y' branch from decision block 552), the process can proceed to block 554.

At block 554, the process 550*e* includes determining if the STA can wait (e.g., delay) performing calibration until the next RAW-cmc calibration event or period (e.g., the next RAW-cmc service period). For example, the STA may determine whether it can wait to perform calibration based on the time elapsed since the last RAW-cmc service, and/or the STA may make the determination of block 554 based on the presence of some external events that would require an immediate calibration service. The external events may be observed in the PHY, such as an observation that the noise floor has elevated above some threshold value.

If a STA does not support the RAW-cmc method described herein (e.g., 'N' branch from decision block 552), then the STA can proceed directly from the decision block 552 to block 556, where the STA uses the conventional way to reserve a quiet medium for self-calibration. That is, at block 556, the STA sends a CTS-To-Self frame to the AP to request for a quiet medium to calibrate. Otherwise, the STA just waits for the next beacon frame with the RPS IE advertising a RAW reserved for device calibration and calibrates the PHY parameters in the next reserved RAW.

For instance, if a STA does support the RAW-cmc method described herein (e.g., 'Y' branch from decision block 552) but can wait to perform calibration until the next RAW-cmc service period (e.g., 'Y' branch from decision block 554), then the process 500*e* terminates with the STA skipping performing block 556, and a CTS-to-self is not sent by the STA to quieten the medium and calibration is not performed by the STA during the current period.

Figure 5F:
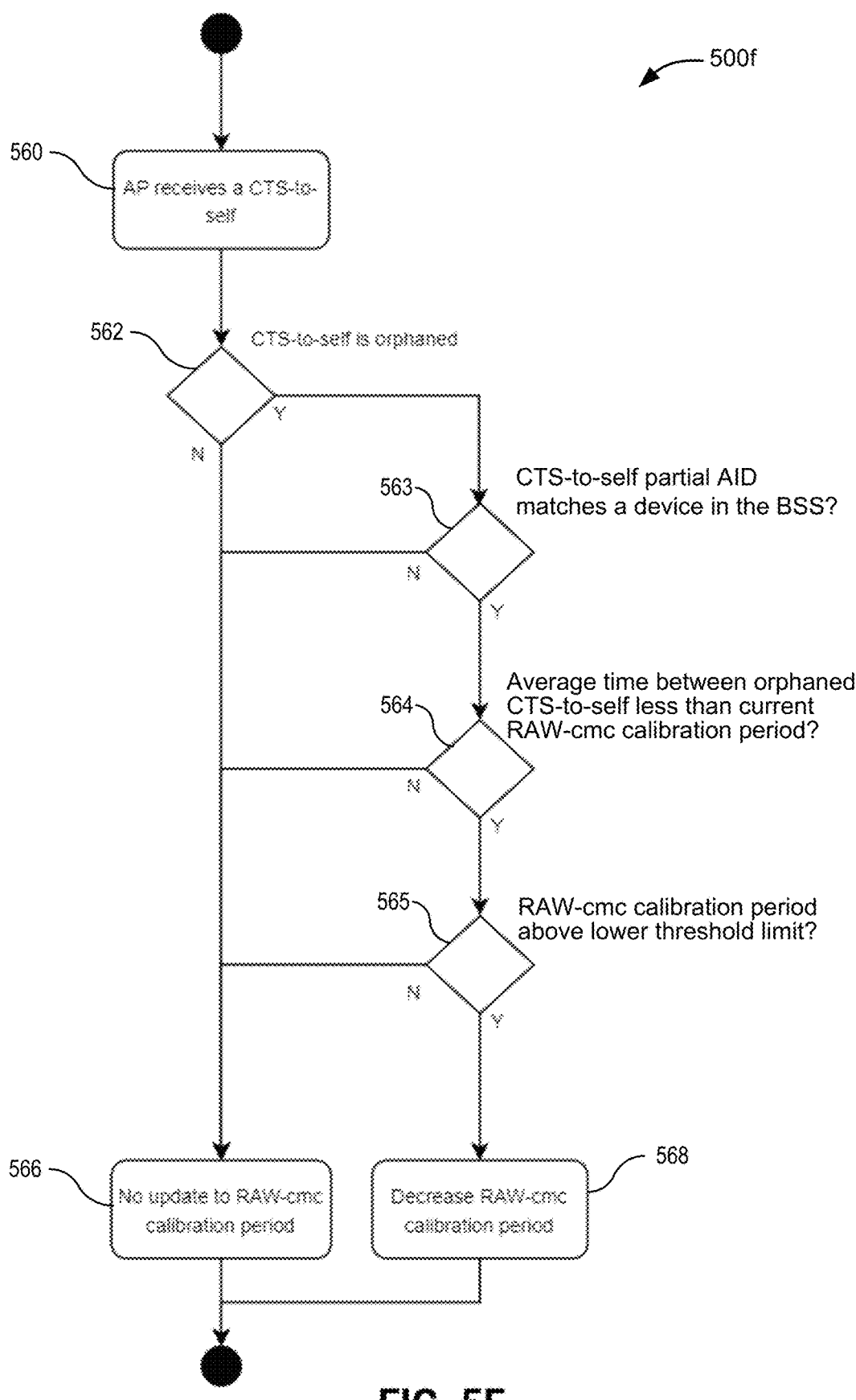
FIG. 5F is a flow diagram of wireless communication for an AP to perform RAW-cmc using a dynamic interval update mode to respond to changes in conditions where STAs may need to calibrate more frequently, in accordance with some embodiments.

FIG. 5F is a flow diagram of a process 500*f* for wireless communication to perform RAW-cmc using a dynamic interval update mode implemented by the AP to respond to changes in conditions where STAs may need to calibrate more frequently, in accordance with some embodiments.

In particular, FIG. 5F depicts an optional dynamic interval update mode that may be implemented in an AP to respond to changes in conditions. For instance, in at least some embodiments, the process 500*f* of FIG. 5F can correspond to a dynamical interval update mode that can be used in response to the AP detecting changes in conditions that may indicate that STAs need to perform calibration more frequently.

In one illustrative example, a dynamic maintenance interval can initially be set as (e.g., can be initialized to) a preset or pre-configured value. The initial value of the dynamic maintenance interval can be used to determine a minimum time interval between two (e.g., consecutive) RAW-cmc events. In some aspects, the dynamic maintenance interval may be adaptively adjusted, where a shorter dynamic maintenance interval indicates the AP will schedule RAWs for device calibration more frequently.

Figure 6:
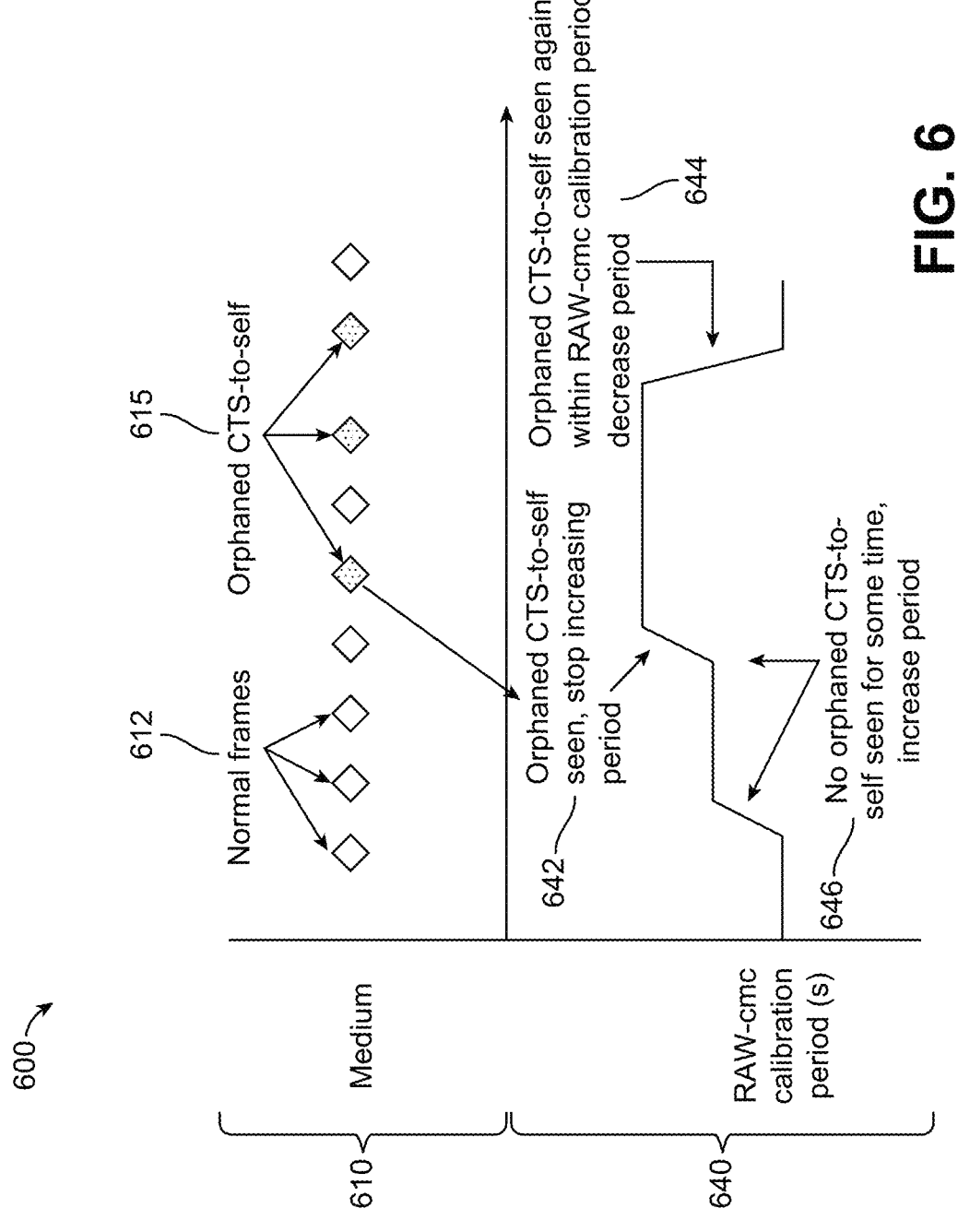
FIG. 6 is a diagram illustrating an RAW-cmc calibration period graph, depicting changes in the RAW-cmc calibration period dynamically over time based on changing requirements of the network and/or STAs, in accordance with an embodiment.

As illustrated, at block 560, process 500*f* can begin with the AP receiving a CTS-To-Self frame from a STA. In some aspects, the CTS-To-Self frame received by the AP from a STA at block 560 of FIG. 5F can correspond to one of the plurality of CTS-To-Self frames depicted on the wireless medium 610 of FIG. 6. The CTS-To-Self frame may be a normal frame (e.g., non-orphaned frame) the same as or similar to one or more of the normal/non-orphaned CTS-To-Self frames 612 of FIG. 6. In some cases, the CTS-To-Self frame may be an orphaned frame, the same as or similar to one of the orphaned CTS-To-Self frames 615 of FIG. 6.

At block 562, the AP checks whether the CTS-To-Self frame is orphaned. For instance, the AP can be configured to determine whether the received CTS-To-Self frame of block 560 is a normal/non-orphaned frame or if it is an orphaned frame. For example, the AP can analyze the time in the CTS-To-Self frame to determine if it is less than a valid frame time, based on an implementation where the CTS-To-Self frame is considered orphaned for when the CTS-To-Self time is shorter than the valid frame time.

If the CTS-To-Self time is less than the valid frame time, then at block 562 the AP determines that the CTS-To-Self frame is orphaned, and proceeds via the 'Y' branch from decision block 562 to the additional decision block 563.

If the CTS-To-Self time is not less than the valid frame time (e.g., if the CTS-To-Self time is greater than or equal to/longer than the valid frame time), then at block 562 the AP determines that the CTS-To-Self frame is not orphaned, and proceeds via the 'N' branch from decision block 562 directly to block 566. At block 566, the process 500*f* terminates by making no update to the RAW-cmc calibration period. For instance, when the CTS-To-Self time is longer than the valid frame time, the AP can wait and see if any traffic occurs after the CTS-To-Self frame, and as such, the dynamic maintenance interval (e.g., RAW-cmc calibration period) can remain unchanged.

At block 563, the AP can be configured to further check whether the orphaned CTS-To-Self frame has a partial AID that matches with a device in the BSS. If the CTS-To-Self partial AID does not match with a device in the BSS, the AP can proceed via the 'N' branch from decision block 563 directly to the no update to RAW-cmc calibration period block 566, described above, where the dynamic maintenance interval remains unchanged if the CTS-To-Self partial AID does not match any device in the BSS.

If the orphaned CTS-To-Self frame has a partial AID that does match with a device in the BSS, the AP can proceed via the 'Y' branch from decision block 563 to the additional decision block 564.

At block 564, when the CTS-To-Self partial AID matches a device in the BSS (e.g., 'Y' at previous decision block 563), the AP can determine whether an average time between orphaned CTS-To-Self frames is less than the current dynamic maintenance interval. The average time between orphaned CTS-To-Self frames can be determined based on multiple CTS-To-Self frames received by the AP. For example, each CTS-To-Self frame received at an instance of block 560 of process 500*f*, and/or included in the multiple orphaned CTS-To-Self frames 615 of FIG. 6.

If the average time between orphaned CTS-To-Self frames is not less than the current RAW-cmc calibration period, then the AP can proceed via 'N' branch from decision block 564 directly to the no update to RAW-cmc calibration period block 566, where the dynamic maintenance interval remains unchanged based on the average time between orphaned CTS-To-Self frames being longer than the current dynamic maintenance interval.

Otherwise, if the average time between orphaned CTS-To-Self frames is greater than or equal to the current RAW-cmc calibration period length, then the AP proceeds via the 'Y' branch from decision block 564 to the additional decision block 565.

At block 565, the AP further checks whether the dynamic maintenance interval length has a value that is above a lower threshold limit. The lower threshold limit can be a configured threshold limit/value associated with one or more of the AP and corresponding STAs. In some aspects, the dynamic maintenance interval cannot be decreased if it is already at the lower threshold limit. As such, if the dynamic maintenance interval is already at the lower threshold limit, the AP can proceed via the 'N' branch from decision block 565 to the no update to RAW-cmc calibration period block 566, where the dynamic maintenance interval remains unchanged based on the current value already being at the configured lower limit threshold.

Otherwise, if the RAW-cmc calibration period is above the configured lower limit threshold value, the AP can proceed via the 'Y' branch from decision block 565 to block 568. At block 568, the AP then decreases the dynamic maintenance interval.

Figure 5G:
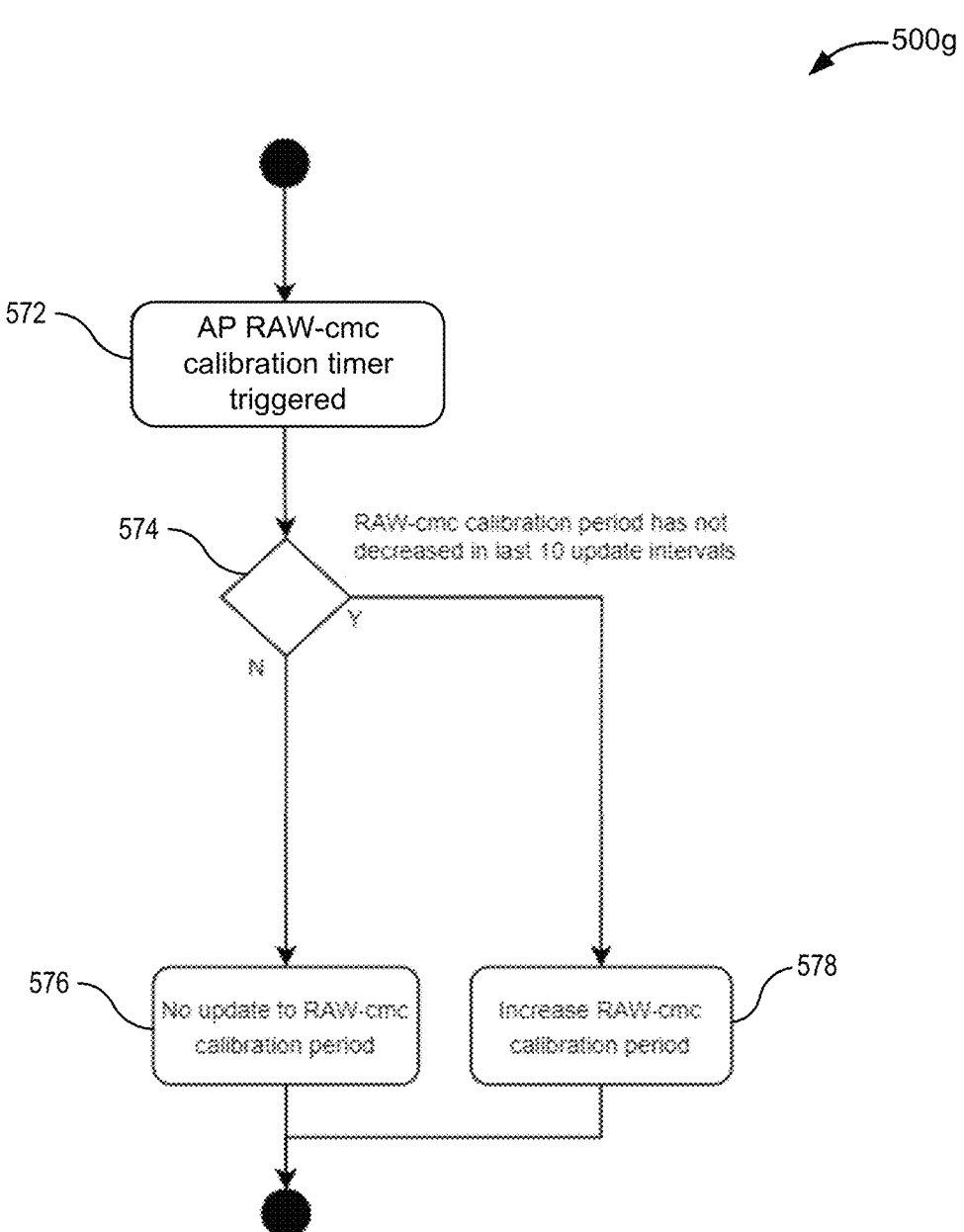
FIG. 5G is a flow diagram of an exemplary wireless communication method implemented by an AP to perform RAW-cmc using a dynamic interval update mode to slowly increase a dynamic maintenance interval, in accordance with some embodiments.

In some embodiments, the flow diagram 500*f* of FIG. 5F corresponds to an example demonstrating a reaction to increase the frequency for calibration by decreasing the calibration period, whereas the flow diagram 500*g* depicted in FIG. 5G corresponds to and illustrates an optional dynamic interval update mode that may be implemented in an AP to slowly increase the dynamic maintenance interval, in at least some embodiments.

In particular, FIG. 5G is a flow diagram of a process 500*g* of wireless communication that can be implemented by an AP to perform RAW-cmc using a dynamic interval update mode to slowly increase a dynamic maintenance interval, in accordance with some examples.

At block 572, the process 500*g* can include an AP RAW-cmc calibration timer being triggered or initiated at the AP. For instance, at block 574, the AP can analyze previous update intervals to check or otherwise determine whether the dynamic maintenance interval has been decreased within any one or more of the last 10 intervals. In other words, firing the AP maintenance update timer at block 572 can correspond to causing the AP to determine, at block 574, whether the RAW-cmc calibration period has been decreased in any of the 10 previous intervals.

In some embodiments, the AP maintenance update timer of block 572 can be set to determine the rate for updating the dynamic maintenance interval for the plurality of STAs associated with the AP. In one illustrative example, the dynamic maintenance interval may be increased in length based on a determination by the AP that the dynamic maintenance interval has not been decreased in any of the last 10 intervals thereof.

In response to determining that the RAW-cmc calibration period has not decreased in the last 10 update intervals, the AP can proceed via the 'Y' branch from decision block 574 to block 578, where the dynamic maintenance interval is increased thus the RAW-cmc calibration period is increased.

If the RAW-cmc calibration period has already been decreased at least once in any of the last 10 update intervals, the AP can proceed via the 'N' branch from decision block 574 to block 576 instead, where no update is made to the RAW-cmc calibration period. In some other embodiments, a fixed maintenance interval may be used for the AP to coordinate RAWs for device calibration.

FIG. 7 is a flow diagram of an example of a process 700 for wireless transmission over a Wireless Local Area Network (WLAN), in accordance with some embodiments. The process 700 can be performed by a wireless communication device, such as a Wi-Fi station (STA). At block 702, the process 700 includes receiving a beacon frame, wherein the beacon frame includes a Restricted Access Window (RAW) Parameter Set (RPS) Information Element (IE). At block 704, the process 700 includes determining that an Association Identity (AID) indicated in the RPS IE of the received beacon frame matches a calibration AID associated with the STA. At block 706, the process 700 includes determining a RAW based on the RPS IE. At block 708, the process 700 includes scheduling a RAW clear medium calibration (RAW-cmc) event within the RAW, based at least in part on the determination that the AID indicated in the RPS IE matches the calibration AID. At block 710, the process 700 includes using the scheduled RAW-cmc event within the RAW to perform calibration for the STA as scheduled.

Figure 8:
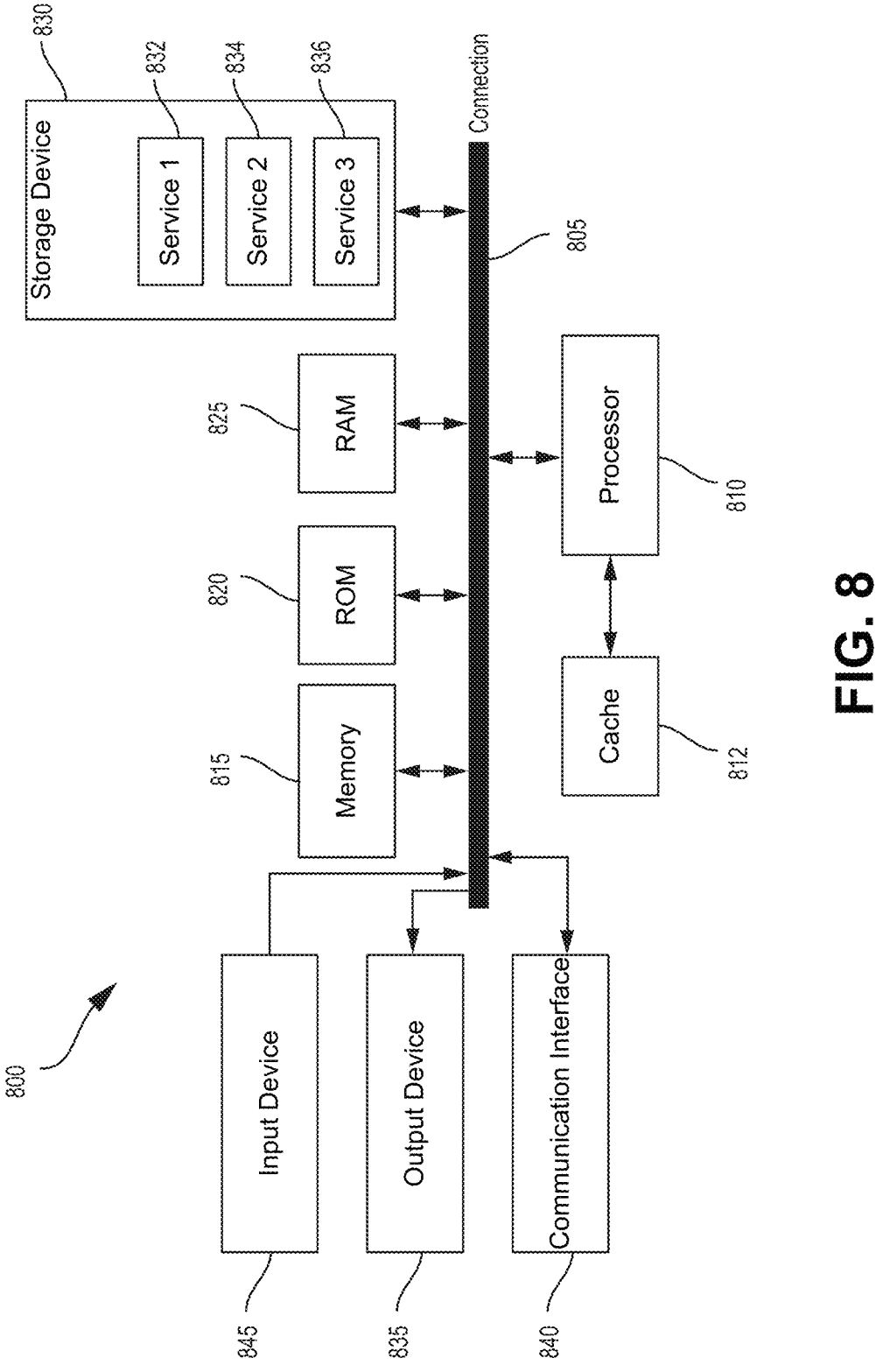
FIG. 8 is a block diagram illustrating an example of a computing system for implementing certain aspects described herein, in accordance with some embodiments.

FIG. 8 illustrates a computing device architecture 800 of a computing device which can implement one or more techniques described herein. In some examples, the computing device can include a mobile device, a wearable device, an extended reality device (e.g., a Virtual Reality (VR) device, an Augmented Reality (AR) device, or a Mixed Reality (MR) device), a personal computer, a laptop computer, a video server, a vehicle (or computing device of a vehicle), or other device. The components of computing device architecture 800 are shown in electrical communication with each other using connection 805, such as a bus. The computing device architecture 800 includes a processing unit 810 and computing device connection 805 that couples various computing device components including computing device memory 815, such as Read Only Memory (ROM) 820 and Random-Access Memory (RAM) 825, to processor 810.

Computing device architecture 800 can include a cache of high-speed memory connected directly with, in close proximity to, or integrated as part of processor 810. Computing device architecture 800 can copy data from memory 815 and/or the storage device 830 to cache 812 for quick access by processor 810. In this way, the cache can provide a performance boost that avoids processor 810 delays while waiting for data. These and other engines can control or be configured to control processor 810 to perform various actions. Other computing device memory 815 may be available for use as well. Memory 815 can include multiple different types of memory with different performance characteristics. Processor 810 can include any general-purpose processor and a hardware or software service, such as service 1 832, service 2 834, and service 3 836 stored in storage device 830, configured to control processor 810 as well as a special-purpose processor where software instructions are incorporated into the processor design. Processor 810 may be a self-contained system, containing multiple cores or processors, a bus, memory controller, cache, etc. A multi-core processor may be symmetric or asymmetric.

To enable user interaction with the computing device architecture 800, input device 845 can represent any number of input mechanisms, such as a microphone for speech, a touch-sensitive screen for gesture or graphical input, keyboard, mouse, motion input, speech and so forth. Output device 835 can also be one or more of a number of output mechanisms known to those of skill in the art, such as a display, projector, television, speaker device, etc. In some instances, multimodal computing devices can enable a user to provide multiple types of input to communicate with computing device architecture 800. Communication interface 840 can generally govern and manage the user input and computing device output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, RAM, ROM, and hybrids thereof. Storage device 830 can include services 832, 834, 836 for controlling processor 810. Other hardware or software modules or engines are contemplated. Storage device 830 can be connected to the computing device connection 805. In one aspect, a hardware module that performs a particular function can include the software or processor readable codes stored in a computer-readable medium in connection with the necessary hardware components, such as processor 810, connection 805, output device 835, and so forth, to carry out the function.

The term "device" is not limited to one or a specific number of physical objects (such as one smartphone, one controller, one processing system and so on). As used herein, a device may be any electronic device with one or more parts that may implement at least some portions of this disclosure.

Individual aspects may be described above as a process or method which is depicted as a flowchart or a data flow diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, or a subprogram. When a process corresponds to a function, its termination can correspond to a return of the function to the calling function or the main function.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above.

The program code may be executed by a processor, which may include one or more processors, such as one or more Digital Signal Processors (DSPs), general purpose microprocessors, an Application Specific Integrated Circuits (ASICs), Field Programmable Gate Arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices.

What is claimed is:

1. A method for managing calibration of a station (STA) in a wireless communication network, the method comprising:
  receiving a beacon frame, wherein the beacon frame includes a Restricted Access Window (RAW) Parameter Set (RPS) Information Element (IE);
  determining that an Association Identity (AID) indicated in the RPS IE of the received beacon frame matches a calibration AID associated with the STA;
  determining a RAW based on the RPS IE;
  scheduling a RAW clear medium calibration (RAW-cmc) event within the RAW, based at least in part on the determination that the AID indicated in the RPS IE matches the calibration AID, wherein a wireless medium of the wireless communication network is reserved as a quiet medium for self-calibration of the STA during the scheduled RAW-cmc event; and
  using the scheduled RAW-cmc event within the RAW to perform self-calibration for the STA during a reserved quiet medium time.

2. The method of claim 1, wherein the RPS IE is indicative of information corresponding to one or more of a start time associated with the RAW, a slot duration associated with the RAW, or a number of slots associated with the RAW.

3. The method of claim 1, wherein to perform calibration for the STA as scheduled, the STA calibrates one or more physical (PHY) layer parameters in the RAW-cmc event during the RAW.

4. The method of claim 1, wherein:
  the RAW-cmc event is scheduled based on a further determination that the STA supports RAW-cmc; and
  the method further comprises restricting any transmission for the STA during the RAW based on a determination that the STA does not support RAW-cmc.

5. The method of claim 1, further comprising:
  determining, in response to the determination that the AID indicated in the RPS IE matches the calibration AID, whether the STA requires calibration;
  scheduling the RAW-cmc event based on a determination that the STA requires calibration; and
  skipping scheduling of the RAW-cmc event based on a determination that the STA does not require calibration.

6. The method of claim 5, wherein the determination that the STA requires calibration is based on an elapsed time since a last quiet medium calibration for the STA.

7. The method of claim 5, wherein the determination that the STA requires calibration is based on one or more external events observed by the STA in a physical (PHY) layer associated with the STA.

8. The method of claim 1, wherein the calibration AID is configured by an Access Point (AP) associated with the STA, and wherein the calibration AID comprises a static value configured within a higher range of allowed AIDs.

9. The method of claim 1, further comprising:
  transmitting, by the STA, an association request to associate with an Access Point (AP) in the wireless communication network;
  receiving an association response from the AP, wherein the association response includes a RAW-cmc vendor IE indicative of the calibration AID and a calibration periodicity for the RAW-cmc event; and
  storing, by the STA, the calibration AID and calibration periodicity indicated in the RAW-cmc vendor IE.

10. The method of claim 1, wherein the STA utilizes a quiet medium for calibration, and wherein the method further comprises:
  determining that the STA supports RAW-cmc;
  determining, based on the determination that the STA supports RAW-cmc, whether the STA can delay performing the calibration until a next RAW-cmc event; and
  in response to determining that the STA does not support RAW-cmc or that the STA cannot delay performing the calibration until the next RAW-cmc event:
    transmitting, by the STA, a Clear To Send to self (CTS-To-Self) frame to reserve a quiet medium for calibration; and
    performing calibration for the STA using a reserved quiet medium corresponding to the CTS-To-Self frame.

11. The method of claim 1, wherein the STA restricts any transmission during the RAW based on a determination that the AID indicated in the RPS IE does not match a calibration AID stored by the STA and does not match an AID associated with the STA.

12. A station (STA) connected to a wireless communication network, the STA comprising:
  a receiver and a transmitter;
  a processor, communicatively coupled to the receiver and the transmitter; and
  one or more memory banks, communicatively coupled to the processor and storing processor readable codes that, when executed by the processor in conjunction with the receiver and transmitter, causes the processor to perform actions comprising:
    receiving a beacon frame with a Restricted Access Window (RAW) Parameter Set (RPS) Information Element (IE);
    determining whether an Association Identity (AID) communicated in the RPS IE of the received beacon frame matches a calibration AID stored in the STA;
    determining a RAW according to the RPS IE;
    scheduling a RAW clear medium calibration (RAW-cmc) event during the RAW, based on a determination the AID communicated in the RPS IE matches the calibration AID, wherein a wireless medium of the wireless communication network is reserved as a quiet medium for self-calibration of the STA during the scheduled RAW-cmc event; and calibrating in the RAW-cmc event as scheduled or otherwise restricting any transmission during the RAW-cmc event, based on the RAW-cmc event corresponding to a reserved quiet medium time.

13. A method for managing calibration of stations (STAs) in a wireless communication network, the method comprising:

determining, by an access point (AP) associated with the STAs, an elapsed time since a last Restricted Access Window (RAW) clear medium calibration (RAW-cmc) event on a wireless medium;

based on the elapsed time being greater than configured threshold time value, inserting an RPS Information Element (IE) including a RAW slot within a RAW associated with a calibration Association Identity (AID) included in a beacon frame generated by the AP; and transmitting the beacon frame on the wireless medium from the AP to one or more stations (STAs) in the wireless communication network, wherein the wireless medium is reserved as a quiet medium for the one or more STAs to perform self-calibration during a reserved quiet medium time, the reserved quiet medium time being during the RAW slot within the RAW.

14. The method of claim 13, further comprising:

receiving an association request from a station (STA) in the wireless communication network;

inserting a RAW-cmc vendor IE containing the calibration AID and calibration periodicity in an association response generated by the AP corresponding to the received association request from the STA; and transmitting the association response with the RAW-cmc vendor IE to the STA.

15. The method of claim 13, wherein the RPS IE is indicative of information corresponding to one or more of a start time associated with a RAW, a slot duration associated with the RAW, or a number of slots associated with the RAW.

16. The method of claim 13, further comprising:

receiving a Clear To Send to self (CTS-To-Self) frame from a station (STA) indicative of a request for calibration in a quiet medium; and reserving the wireless medium for the STA to perform calibration according to the CTS-To-Self frame, wherein a reserved wireless medium is inaccessible for any data transfer during a reserved time.

17. The method of claim 13, further comprising:

comparing the elapsed time since the last RAW-cmc event to a dynamic maintenance interval value obtained by the AP; and transmitting the beacon frame based on a determination that the elapsed time since the last RAW-cmc event is greater than the dynamic maintenance interval value.

18. The method of claim 17, further comprising adaptively updating the dynamic maintenance interval.

19. The method of claim 18, wherein adaptively updating the dynamic maintenance interval comprises decreasing the dynamic maintenance interval in response to:

receiving an orphaned CTS-To-Self frame by the AP;

determining, by the AP, that a CTS-To-Self partial AID matches with a device in the wireless communication network;

determining, by the AP, that an average time between orphaned CTS-To-Self frames is less than the dynamic maintenance interval and that the dynamic maintenance interval is greater than a configured lower limit value.

20. The method of claim 19, wherein the orphaned CTS-To-Self frame is associated with a CTS time less than a valid frame time associated with the AP.

21. The method of claim 18, wherein adaptively updating the dynamic maintenance interval further comprises:

determining that an update timer associated with the AP has expired;

determining, by the AP and based on expiration of the update timer, whether the dynamic maintenance interval has been decreased in any one of a last 10 update intervals; and based on determining that the dynamic maintenance interval has not been decreased in any one of the last 10 update intervals, increasing the dynamic maintenance interval; or based on determining that the dynamic maintenance interval has been decreased in any one of the last 10 update intervals, using an unchanged dynamic maintenance interval value.

22. An Access Point (AP) connected to a wireless communication network, the AP comprising:

a receiver and transmitter;

a processor, communicatively coupled to the receiver and transmitter; and one or more memory banks, communicatively coupled to the processor and storing processor readable codes that, when executed by the processor in conjunction with the receiver and transmitter, is configured for:

checking if there is enough time elapsed since a last Restricted Access Window (RAW) clear medium calibration (RAW-cmc) event during which a wireless medium of the wireless communication network is reserved as a quiet medium for self-calibration of one or more stations (STAs) associated with the AP;

inserting a RAW Parameter Set (RPS) Information Element (IE) with a RAW slot assigned to a calibration Association Identity (AID) in a beacon frame when there is enough time elapsed since the last RAW-cmc event;

transmitting the beacon frame to the one or more STAs in the wireless communication network by the transmitter; and scheduling a current RAW-cmc event for device self-calibration during a reserved quiet medium time of the current RAW-cmc event.

* * * * *